US011914691B2

(12) United States Patent
Zhao

(10) Patent No.: US 11,914,691 B2
(45) Date of Patent: Feb. 27, 2024

(54) METHOD FOR RECOGNIZING IDENTITY IN VIDEO CONFERENCE AND RELATED DEVICE

(71) Applicant: HUAWEI TECHNOLOGIES CO., LTD., Shenzhen (CN)

(72) Inventor: Guangyao Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 901 days.

(21) Appl. No.: 16/923,259

(22) Filed: Jul. 8, 2020

(65) Prior Publication Data
US 2020/0342084 A1    Oct. 29, 2020

Related U.S. Application Data

(63) Continuation of application No. PCT/CN2018/120835, filed on Dec. 13, 2018.

(30) Foreign Application Priority Data

Jan. 10, 2018 (CN) .......................... 201810024620.7

(51) Int. Cl.
*G06F 21/32* (2013.01)
*H04L 12/18* (2006.01)
(Continued)

(52) U.S. Cl.
CPC ............ *G06F 21/32* (2013.01); *G06V 40/168* (2022.01); *G10L 15/26* (2013.01);
(Continued)

(58) Field of Classification Search
CPC .............................. G06F 21/32; H04L 12/1831
See application file for complete search history.

(56) References Cited

U.S. PATENT DOCUMENTS

| 5,412,738 A | 5/1995 | Brunelli et al. |
| 7,711,145 B2 | 5/2010 | Gallagher |

(Continued)

FOREIGN PATENT DOCUMENTS

| CN | 102638359 A | 8/2012 |
| CN | 104537351 A | 4/2015 |

(Continued)

*Primary Examiner* — Viral S Lakhia
(74) *Attorney, Agent, or Firm* — Maier & Maier, PLLC

(57) ABSTRACT

A method for recognizing an identity in a video conference including: obtaining, by an identity recognition apparatus, first biometric feature information in a video conference; obtaining second biometric feature information corresponding to an identity list in a database and a conference probability value corresponding to the identity list, where the identity list includes at least one personal unique identifier, and the biometric feature information first and the second biometric feature information include at least one of facial feature information and voiceprint feature information, and the conference probability value is determined based on at least one of a participation probability value and a same conference probability value; and determining, from the identity list and based on the second biometric feature information corresponding to the identity list and the conference probability value corresponding to the identity list, a personal unique identifier corresponding to the first biometric feature information.

19 Claims, 15 Drawing Sheets

(51) Int. Cl.
*G10L 15/26* (2006.01)
*H04N 7/15* (2006.01)
*G06V 40/16* (2022.01)

(52) U.S. Cl.
CPC ...... *H04L 12/1822* (2013.01); *H04L 12/1831* (2013.01); *H04N 7/15* (2013.01)

(56) References Cited

U.S. PATENT DOCUMENTS

| | | | |
|---|---|---|---|
| 7,956,890 B2* | 6/2011 | Cheng | G06T 7/90 |
| | | | 382/118 |
| 9,282,284 B2* | 3/2016 | Kajarekar | G06V 40/172 |
| 9,558,523 B1* | 1/2017 | Hodge | G06V 40/50 |
| 9,600,069 B2* | 3/2017 | Publicover | G06V 40/19 |
| 9,633,187 B1* | 4/2017 | Kozko | G06F 21/32 |
| 9,721,086 B2* | 8/2017 | Shear | G06F 21/6218 |
| 10,200,206 B2* | 2/2019 | Wallbaum | H04L 12/1822 |
| 10,511,808 B2* | 12/2019 | Harrison | G06T 7/246 |
| 10,671,712 B1* | 6/2020 | Lindley | H04L 63/0861 |
| 2009/0123035 A1* | 5/2009 | Khouri | G06V 20/52 |
| | | | 382/115 |
| 2010/0149305 A1 | 6/2010 | Catchpole et al. | |
| 2013/0063548 A1* | 3/2013 | Rosenberg | H04N 7/142 |
| | | | 348/14.09 |
| 2013/0162752 A1 | 6/2013 | Herz et al. | |
| 2016/0104122 A1* | 4/2016 | Mande | H04W 4/029 |
| | | | 705/7.19 |
| 2017/0280100 A1* | 9/2017 | Hodge | G06V 20/52 |
| 2019/0190908 A1* | 6/2019 | Shen | H04L 63/0861 |
| 2019/0205887 A1* | 7/2019 | Kimmel | G06Q 20/3224 |

FOREIGN PATENT DOCUMENTS

| | | |
|---|---|---|
| CN | 104639777 A | 5/2015 |
| CN | 104767963 A | 7/2015 |
| CN | 105426723 A | 3/2016 |
| CN | 105956552 A | 9/2016 |
| CN | 106209725 A | 12/2016 |
| CN | 106657865 A | 5/2017 |
| CN | 106790054 A | 5/2017 |
| CN | 107370981 A | 11/2017 |

* cited by examiner

METHOD FOR RECOGNIZING IDENTITY IN VIDEO CONFERENCE AND RELATED DEVICE

CROSS-REFERENCE TO RELATED APPLICATIONS

This application is a continuation of International Application No. PCT/CN2018/120835, filed on Dec. 13, 2018, which claims priority to Chinese Patent Application No. 201810024620.7, filed on Jan. 10, 2018. The disclosures of the aforementioned applications are hereby incorporated by reference in their entireties.

TECHNICAL FIELD

An embodiment relates to the field of communications technologies, and specifically, to a method for recognizing an identity in a video conference and a related device.

BACKGROUND

With development of the Internet, communication between people is more convenient. A video conference enables participants in two or more different places to participate in the conference as if they were in a same place. In some conference scenarios, biometric features of participants need to be automatically collected and screened for identity recognition.

An identity recognition method combining facial recognition and voiceprint recognition is disclosed in the prior art. When recognition results of facial recognition and voiceprint recognition are inconsistent, an identity recognition result with a higher confidence level is determined as a final identity recognition result. However, this two-feature identity recognition method combining facial recognition and voiceprint recognition cannot meet the requirements of a conference scenario for identity recognition accuracy, or in other words, has low accuracy.

SUMMARY

An embodiment provides a method for recognizing an identity in a video conference and a related device, to improve accuracy of identity recognition.

According to a first aspect, an embodiment provides a method for recognizing an identity in a video conference. The method is applied to an identity recognition apparatus, and the identity recognition apparatus may be user equipment or a server. The identity recognition apparatus obtains first biometric feature information in a video conference, where the first biometric feature information includes at least one of facial feature information and voiceprint feature information. The identity recognition apparatus further obtains second biometric feature information corresponding to an identity list in a database and a conference probability value corresponding to the identity list, where the identity list includes at least one personal unique identifier (PUID), the second biometric feature information includes at least one of facial feature information and voiceprint feature information, and the conference probability value is determined based on at least one of a participation probability value and a same conference probability value. The identity recognition apparatus determines, from the identity list and based on the second biometric feature information corresponding to the identity list and the conference probability value corresponding to the identity list, a PUID corresponding to the first biometric feature information. It may be contemplated that an identity is recognized by using the conference probability value and at least one of the facial feature information and the voiceprint feature information. This effectively improves accuracy of identity recognition and well meets a requirement of a conference scenario for accuracy of identity recognition.

In an exemplary implementation process, the identity recognition apparatus may determine, from the identity list and based on the second biometric feature information corresponding to the identity list and the conference probability value corresponding to the identity list, the PUID corresponding to the first biometric feature information in a plurality of manners. The following describes several possible implementations.

If the first biometric feature information includes the facial feature information, and the second biometric feature information includes the facial feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a preset threshold, and the preset threshold is set in advance by a terminal or a server based on an actual requirement. The identity recognition apparatus determines a second short list from the first short list based on a conference probability value corresponding to the first short list, where the second short list includes a PUID corresponding to largest N conference probability values in the first short list, and N is an integer greater than 0. The identity recognition apparatus determines, from the second short list and based on the facial feature information in the second biometric feature information corresponding to the second short list, the PUID corresponding to the first biometric feature information, where facial feature information corresponding to the PUID corresponding to the first biometric feature information is most similar to the facial feature information in the first biometric feature information. It may be contemplated that voiceprint feature information does not need to be collected. Because it takes some time, for example, tens of seconds, to collect the voiceprint feature information, an overall response speed of identity recognition is affected. In an embodiment, identity recognition is directly performed by combining facial feature information and a conference probability value. This effectively improves accuracy and the overall response speed of identity recognition.

If the first biometric feature information includes the voiceprint feature information, and the second biometric feature information includes the voiceprint feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a preset threshold, and the preset threshold is set in advance by a terminal or a server based on an actual requirement. The identity recognition apparatus determines a second short list from the first short list based on a conference probability value corresponding to the first short list, where the second short list includes a PUID corresponding to largest N conference probability values in the first short list, and N is an integer greater than 0. The identity recognition apparatus determines, from the second short list and based on the voiceprint feature information in the second biometric feature information corresponding to the second short list, the PUID corresponding to the first biometric feature information, where voiceprint feature information corresponding to the PUID corresponding to the first biometric feature information is most similar to the voiceprint feature information in the first biometric feature information. Because a voiceprint is not only specific, but also is relatively stable, identity recognition is performed by combining voiceprint feature information and a conference probability value. This further improves accuracy of identity recognition.

If the first biometric feature information includes the facial feature information and the voiceprint feature information, and the second biometric feature information includes the facial feature information and the biometric feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a first preset threshold, and the first preset threshold is set in advance by a terminal or a server based on an actual requirement. The identity recognition apparatus determines a second short list from the first short list based on the voiceprint feature information in the second biometric feature information corresponding to the first short list, where a similarity between the voiceprint feature information in the second biometric feature information corresponding to the second short list and the voiceprint feature information in the first biometric feature information is not less than a second preset threshold, and the second preset threshold is set in advance by a terminal or a server based on an actual requirement. The identity recognition apparatus determines a third short list from the second short list based on a conference probability value corresponding to the second short list, where the third short list includes a PUID corresponding to largest N conference probability values in the second short list, and N is an integer greater than 0. The identity recognition apparatus determines, from the third short list and based on the facial feature information in the second biometric feature information corresponding to the third short list, the PUID corresponding to the first biometric feature information, where facial feature information corresponding to the PUID corresponding to the first biometric feature information is most similar to the facial feature information in the first biometric feature information. It may be contemplated that identity recognition is performed by using the facial feature information, the voiceprint feature information, and the conference probability value. This effectively improves accuracy of identity recognition and well meets a requirement of a conference scenario for accuracy of identity recognition.

If the first biometric feature information includes the facial feature information and the voiceprint feature information, and the second biometric feature information includes the facial feature information and the biometric feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a first preset threshold, and the first preset threshold is set in advance by a terminal or a server based on an actual requirement. The identity recognition apparatus determines a second short list from the first short list based on the facial feature information in the second biometric feature information corresponding to the first short list, where a similarity between the facial feature information in the second biometric feature information corresponding to the second short list and the facial feature information in the first biometric feature information is not less than a second preset threshold, and the second preset threshold is set in advance by a terminal or a server based on an actual requirement. The identity recognition apparatus determines a third short list from the second short list based on a conference probability value corresponding to the second short list, where the third short list includes a PUID corresponding to largest N conference probability values in the second short list, and N is an integer greater than 0. The identity recognition apparatus determines, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information. It may be contemplated that identity recognition is performed by using the facial feature information, the voiceprint feature information, and the conference probability value. This effectively improves accuracy of identity recognition and well meets a requirement of a conference scenario for accuracy of identity recognition.

If the first biometric feature information includes the facial feature information and the voiceprint feature information, and the second biometric feature information includes the facial feature information and the biometric feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a preset threshold, and the preset threshold is set in advance by a terminal or a server based on an actual requirement. The identity recognition apparatus determines a second short list from the first short list based on a conference probability value corresponding to the first short list, where the second short list includes a PUID corresponding to largest N conference probability values in the first short list, and N is an integer greater than 0. The identity recognition apparatus determines, from the second short list and based on the voiceprint feature information in the second biometric feature information corresponding to the second short list, the PUID corresponding to the first biometric feature information, where voiceprint feature information corresponding to the PUID corresponding to the first biometric feature information is most similar to the voiceprint feature information in the first biometric feature information. It may be contemplated that identity recognition is performed by using the facial feature information, the voiceprint feature information, and the conference probability value. This effectively improves accuracy of identity recognition and well meets a requirement of a conference scenario for accuracy of identity recognition.

If the first biometric feature information includes the voiceprint feature information and the facial feature information, and the second biometric feature information includes the voiceprint feature information and the facial feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a preset threshold, and the preset threshold is set in advance by a terminal or a server based on an actual requirement. The identity recognition apparatus determines a second short list from the first short list based on a conference probability value corresponding to the first short list, where the second short list includes a PUID corresponding to largest N conference probability values in the first short list, and N is an integer greater than 0. The identity recognition apparatus determines, from the second short list and based on the facial feature information in the second biometric feature information corresponding to the second short list, the PUID corresponding to the first biometric feature information, where facial feature information corresponding to the PUID corresponding to the first biometric feature information is most similar to the facial feature information in the first biometric feature information. It may be contemplated that identity recognition is performed by using the facial feature information, the voiceprint feature information, and the conference probability value. This effectively improves accuracy of identity recognition and well meets a requirement of a conference scenario for accuracy of identity recognition.

If the first biometric feature information includes the facial feature information and the voiceprint feature information, and the second biometric feature information includes the facial feature information and the biometric feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a first preset threshold, and the first preset threshold is set in advance by a terminal or a server based on an actual requirement. The identity recognition apparatus determines a second short list from the first short list based on the voiceprint feature information in the second biometric feature information corresponding to the first short list, where a similarity between the voiceprint feature information in the second biometric feature information corresponding to the second short list and the voiceprint feature information in the first biometric feature information is not less than a second preset threshold, and the second preset threshold is set in advance by a terminal or a server based on an actual requirement. The identity recognition apparatus determines a third short list from the second short list based on a conference probability value corresponding to the second short list, where the third short list includes a PUID corresponding to largest N conference probability values in the second short list, and N is an integer greater than 0. The identity recognition apparatus determines, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information. It may be contemplated that identity recognition is performed by using the facial feature information, the voiceprint feature information, and the conference probability value. This effectively improves accuracy of identity recognition and well meets a requirement of a conference scenario for accuracy of identity recognition.

If the first biometric feature information includes the facial feature information and the voiceprint feature information, and the second biometric feature information includes the facial feature information and the biometric feature information, that the identity recognition apparatus determines, from the identity list and based on the second biometric feature information corresponding to the identity list and the conference probability value corresponding to the identity list, the PUID corresponding to the first biometric feature information includes: The identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a first preset threshold, and the first preset threshold is set in advance by a terminal or a server based on an actual requirement. The identity recognition apparatus determines a second short list from the first short list based on the facial feature information in the second biometric feature information corresponding to the first short list, where a similarity between the facial feature information in the second biometric feature information corresponding to the second short list and the facial feature information in the first biometric feature information is not less than a second preset threshold, and the second preset threshold is set in advance by a terminal or a server based on an actual requirement. The identity recognition apparatus determines a third short list from the second short list based on a conference probability value corresponding to the second short list, where the third short list includes a PUID corresponding to largest N conference probability values in the second short list, and N is an integer greater than 0. The identity recognition apparatus determines, from the third short list and based on the facial feature information in the second biometric feature information corresponding to the third short list, the PUID corresponding to the first biometric feature information, where facial feature information corresponding to the PUID corresponding to the first biometric feature information is most similar to the facial feature information in the first biometric feature information. It may be contemplated that identity recognition is performed by using the facial feature information, the voiceprint feature information, and the conference probability value. This effectively improves accuracy of identity recognition and well meets a requirement of a conference scenario for accuracy of identity recognition.

In an implementation process, the conference probability value is determined based on at least one of the participation probability value and the same conference probability value, where the conference probability value is the participation probability value or the same conference probability value, or the conference probability value is a result determined in a preset manner by using the participation probability value and the same conference probability value. The preset manner includes but is not limited to one of an arithmetic average value, a weighted average value, and a maximum value.

The participation probability value is determined based on participation information, where the participation information includes at least one of historical participation information and current participation information. In other words, the participation probability value may be determined by using the historical participation information or the current participation information, or the participation probability value is determined in a preset manner by using the historical participation information and the current participation information. The current participation information includes at least one of location information of a conference room, conference notification information, personnel location information, and conference recording information, the conference recording information includes identity information corresponding to a PUID, and the identity information corresponding to the PUID includes at least one of a name, a nickname, a job title, and an employee identification (ID). The historical participation information includes at least one of location information of a conference room, conference notification information, personnel location information, and conference recording information, the conference recording information includes identity information corresponding to a PUID, and the identity information corresponding to the PUID includes at least one of a name, a nickname, a job title, and an employee ID.

In another implementation, the participation probability value is determined based on at least one of a participation statistical probability value and a participation calculation probability value. In other words, the participation probability value is determined by using the participation statistical probability value or the participation calculation probability value, or the participation probability value is determined in a preset manner by using the participation statistical probability value and the participation calculation probability value. The preset manner includes but is not limited to one of an arithmetic average value, a weighted average value, and a maximum value. The participation calculation probability value is determined based on at least one of a location relationship calculation probability value and a conference notification calculation probability value. In other words, the participation calculation probability value is determined based on the location relationship calculation probability value or the conference notification calculation probability value, or the participation calculation probability value is determined in a preset manner based on the location relationship calculation probability value and the conference notification calculation probability value. The preset manner includes but is not limited to one of an arithmetic average value, a weighted average value, and a maximum value. The participation statistical probability value is determined based on the historical participation information, and the location relationship calculation probability value and the conference notification calculation probability value are determined based on the current participation information.

The same conference probability value is determined based on participation information, for example, based on at least one of historical same conference information and current same conference information. In other words, the same conference probability value is determined based on the historical same conference information or the current same conference information, or the same conference probability value is determined in a preset manner based on the historical same conference information and the current same conference information. The current same conference information includes at least one of conference notification information, interpersonal relationship information, and personal location information. The historical same conference information includes at least one of conference notification information, interpersonal relationship information, and personal location information.

In another implementation, the same conference probability value is determined based on at least one of a same conference statistical probability value and a same conference calculation probability value. In other words, the same conference probability value is determined based on the same conference statistical probability value or the same conference calculation probability value, or the same conference probability value is determined in a preset manner based on the same conference statistical probability value and the same conference calculation probability value. The preset manner includes but is not limited to one of an arithmetic average value, a weighted average value, and a maximum value. The same conference calculation probability value is determined based on at least one of an organizational relationship calculation probability value and a friend relationship calculation probability value. In other words, the same conference calculation probability value is determined based on the organizational relationship calculation probability value or the friend relationship calculation probability value, or the same conference calculation probability value is determined in a preset manner based on the organizational relationship calculation probability value and the friend relationship calculation probability value. The preset manner includes but is not limited to one of an arithmetic average value, a weighted average value, and a maximum value. The same conference statistical probability value is determined based on the historical participation information, and the organizational relationship calculation probability value and the friend relationship calculation probability value are determined based on the current participation information.

In an implementation process, to improve a conference probability value corresponding to a PUID, there are the following several possible implementations.

If the first short list further includes the identity information corresponding to the PUID, before determining the second short list from the first short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the first short list, and improves a conference probability value of a PUID that is in the first short list and that has the mentioned identity information.

If the second short list further includes the identity information corresponding to the PUID, before determining the third short list from the second short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the second short list, and improves a conference probability value of a PUID that is in the second short list and that has the mentioned identity information.

If the first short list further includes the identity information corresponding to the PUID, before determining the second short list from the first short list, the identity recognition apparatus sends conference recording information during a current conference to a voice recognition server, receives identity information that is determined based on the conference recording information and that is from the voice recognition server, compares the determined identity information with identity information corresponding to the first short list, and improves a conference probability value of a PUID that is in the first short list and that has the determined identity information.

If the second short list further includes the identity information corresponding to the PUID, before determining the third short list from the second short list, the identity recognition apparatus sends conference recording information during a current conference to a voice recognition server, receives identity information that is determined based on the conference recording information and that is from the voice recognition server, compares the determined identity information with identity information corresponding to the second short list, and improves a conference probability value of a PUID that is in the second short list and that has the determined identity information.

According to a second aspect, an embodiment provides an identity recognition apparatus. The identity recognition apparatus has a function performed by the identity recognition apparatus in any one of the first aspect or the implementations of the first aspect. The function may be implemented by hardware, or may be implemented by hardware by executing corresponding software. The hardware or the software includes one or more modules corresponding to the function.

According to a third aspect, an embodiment provides an identity recognition apparatus. The identity recognition apparatus includes a memory, a network interface, and a processor. The memory is configured to store computer-executable program code, and is coupled to the network interface. The program code includes an instruction. When the processor executes the instruction, the instruction enables the identity recognition apparatus to execute information or an instruction in any one of the first aspect or the implementations of the first aspect.

According to a fourth aspect, an embodiment provides a computer storage medium, including an instruction. When the instruction runs on a computer, the computer is enabled to perform the method provided in any one of the first aspect or the implementations of the first aspect.

According to a fifth aspect, an embodiment provides a computer program product including an instruction. When the instruction runs on a computer, the computer is enabled to perform the method provided in any one of the first aspect or the implementations of the first aspect.

It may be contemplated from the foregoing technical solutions that the embodiments have the following advantages:

An identity recognition apparatus obtains first biometric feature information in a video conference, where the first biometric feature information includes at least one of facial feature information and voiceprint feature information. The identity recognition apparatus further obtains second biometric feature information corresponding to an identity list in a database and a conference probability value corresponding to the identity list, where the identity list includes at least one PUID, the second biometric feature information includes at least one of facial feature information and voiceprint feature information, and the conference probability value is determined based on at least one of a participation probability value and a same conference probability value. The identity recognition apparatus determines, from the identity list and based on the second biometric feature information corresponding to the identity list and the conference probability value corresponding to the identity list, a PUID corresponding to the first biometric feature information. It may be contemplated that an identity is recognized by using the conference probability value and at least one of the facial feature information and the voiceprint feature information. This effectively improves accuracy of identity recognition and well meets a requirement of a conference scenario for accuracy of identity recognition.

DESCRIPTION OF EMBODIMENTS

The following clearly describes the technical solutions in the embodiments with reference to the accompanying drawings in the embodiments.

A video conference is a multimedia communication mode in which a conference is held by using a communications network. In a conference room, there are usually a plurality of participants. To clearly present the voice and countenance of a speaker, a camera is usually used to give a close-up of the speaker. Artificial intelligence (AI) is widely applied to the conference room, for example, in facial recognition participation, facial recognition sign-in, welcome information, electronic nameplate, voice activation tracking, and conference statistics. The facial recognition participation means that when an authorized participant appears, an identity recognition apparatus automatically triggers start and preparation of devices in the conference room, and accesses a scheduled conference. The facial recognition sign-in means that when the authorized participant appears, the authorized participant automatically signs in by using the identity recognition apparatus. The welcome information means that when the authorized participant appears, the identity recognition apparatus automatically displays words of "Welcome xxx!" on a screen. The electronic nameplate means that a name, an honorific title or the like of the authorized participant is automatically displayed on the close-up. The voice activation tracking means that when the authorized participant speaks "Hello! Please give a close-up of xxx!", the identity recognition apparatus automatically finds xxx, and gives a close-up of xxx. The conference statistics means that a period and duration in which each participant participates in a conference are measured. However, in this conference scenario, a conference system cannot recognize an identity of a participant in real time through login and active cooperation of the participant, and needs to automatically collect and screen a biometric feature of the participant and perform identity recognition. In this conference scenario, because a recognition result is perceived by the participant in real time, once an identity recognition result is incorrect, conference experience of the participant is adversely affected. Therefore, it is very important to continuously improve accuracy of identity recognition. An existing identity recognition method cannot well meet a requirement of a conference scenario for accuracy of identity recognition. Therefore, to improve accuracy of identity recognition, an embodiment provides a method and a related device.

Figure 1:
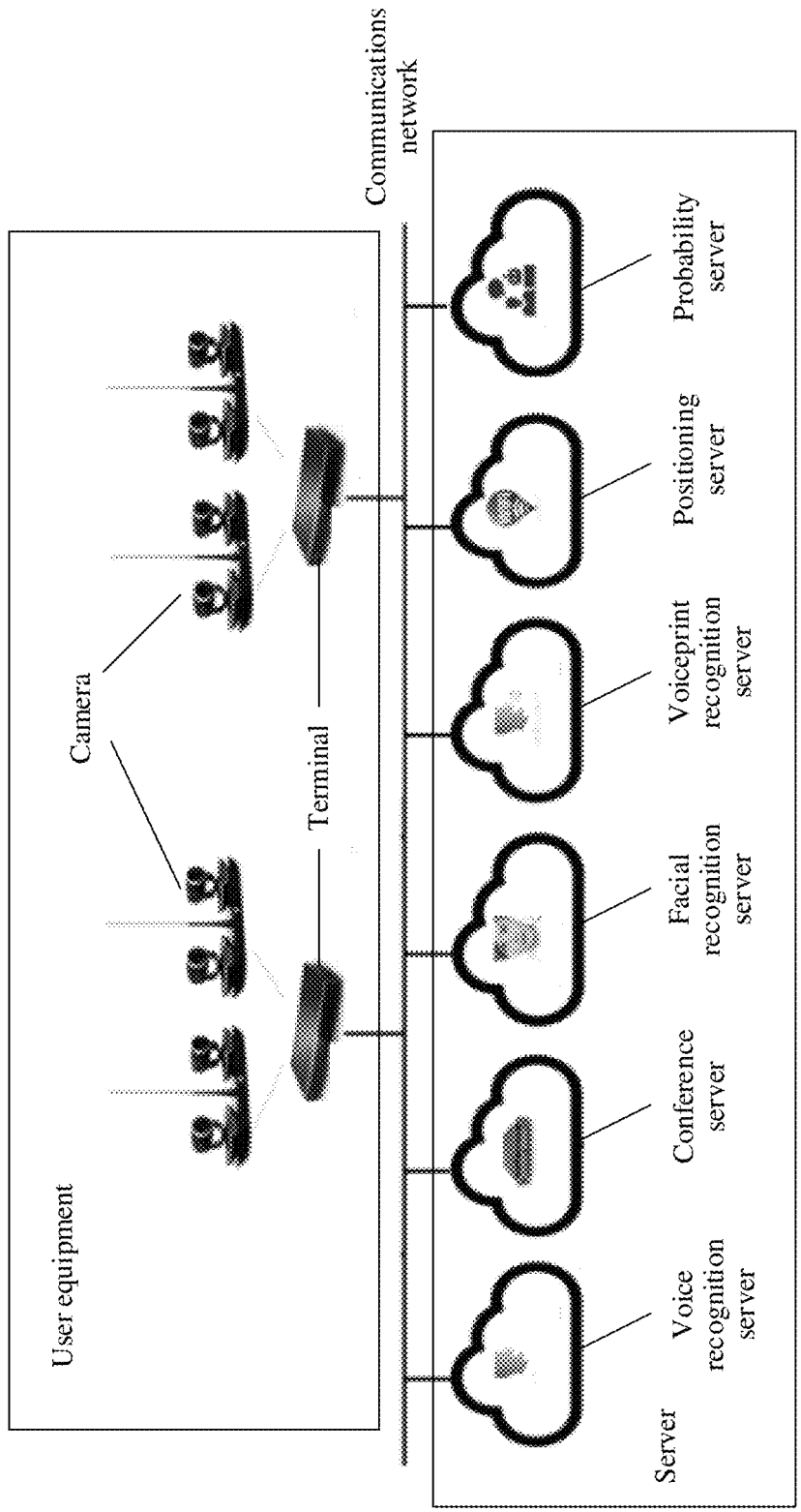
FIG. 1 is a schematic diagram of a structure of a video conference communications system according to an embodiment.

An embodiment provides a method for recognizing an identity in a video conference. The method is applied to a video conference communications system. As shown in FIG. 1, the video conference communications system includes at least one user equipment and at least one server. The user equipment includes but is not limited to a terminal and a camera. In other words, the user equipment may be a terminal or a camera, or may be a terminal and a camera, or may be a device integrating all functions of a terminal and a camera. The terminal includes but is not limited to a computer, a mobile phone, a tablet computer, a personal digital assistant (PDA), and a vehicle-mounted computer. The server includes but is not limited to a facial recognition server, a voiceprint recognition server, a voice recognition server, a positioning server, a probability server, and a conference server. In other words, the server may be at least one of the facial recognition server, the voiceprint recognition server, the voice recognition server, the positioning server, the probability server, and the conference server, or may be a server integrating all functions of the facial recognition server, the voiceprint recognition server, the voice recognition server, the positioning server, the probability server, and the conference server. This is not specifically limited herein.

In an implementation process, the user equipment is communicatively connected to the server. The communication connection may be a wireless or wired communication connection. Wireless communication may include at least one of the following: wireless fidelity (Wi-Fi), Bluetooth, a wireless personal area network (zigbee), near field communication (NFC), global positioning system (GPS), and cellular communication, for example, long term evolution (LTE), code division multiple access (CDMA), wideband code division multiple access (WCDMA), universal mobile telecommunications system (UMTS), wireless broadband (WiBro), global system for mobile communications (GSM), and worldwide interoperability for microwave access (WiMAX). Wired communication may include at least one of the following: universal serial bus (USB), high-definition multimedia interface (HDMI), recommended standard 232 (RS-232), and telephone voice (POTS).

The following describes main functions of the user equipment and the server.

The main functions of the terminal are: establishing a call connection with a peer end, where the call connection may be established by using an application running on the terminal or an official account, and local video information, local audio information, and local control information are encoded and packed and then sent to the peer end. A data packet received from the peer end can be further decoded and restored to the video information, the audio information, and the control information. The terminal further has conference control and image display functions, and may execute various AI applications, for example: facial recognition participation, facial recognition sign-in, welcome information, electronic nameplate, voice activation tracking, and conference statistics.

The camera, as an external device of the terminal, may be an AI camera. The AI camera generally has a pan-tilt-zoom (PTZ) function. A shooting action of the camera may be controlled by using an infrared remote control, or may be controlled by using an intelligent tracking method, to present a close-up of a speaker. The AI camera may further have a voice tracking function, and may automatically position a speaker, and give a close-up of the speaker.

The facial recognition server is configured to recognize an identity based on facial feature information. The voiceprint recognition server is configured to recognize the identity based on voiceprint feature information, and the voiceprint feature information is unrelated to content of speech. The voice recognition server is configured to recognize the identity based on voice information, and the voice information is related to the content of speech. The positioning server is configured to determine a conference room or specific location information of a person. A technology used in a positioning process may be an indoor positioning technology or an outdoor positioning technology such as Wi-Fi positioning, infrared positioning, ultrasonic positioning, GPS positioning, or zigbee positioning. This may be determined based on an actual situation, and is not limited herein. The probability server is configured to determine a conference probability value corresponding to each PUID. The conference server is configured to establish a corresponding database based on the facial feature information, the voiceprint feature information, the conference probability value, the PUID, and identity information corresponding to the PUID, perform real-time update, and provide a corresponding query service.

Figure 2:
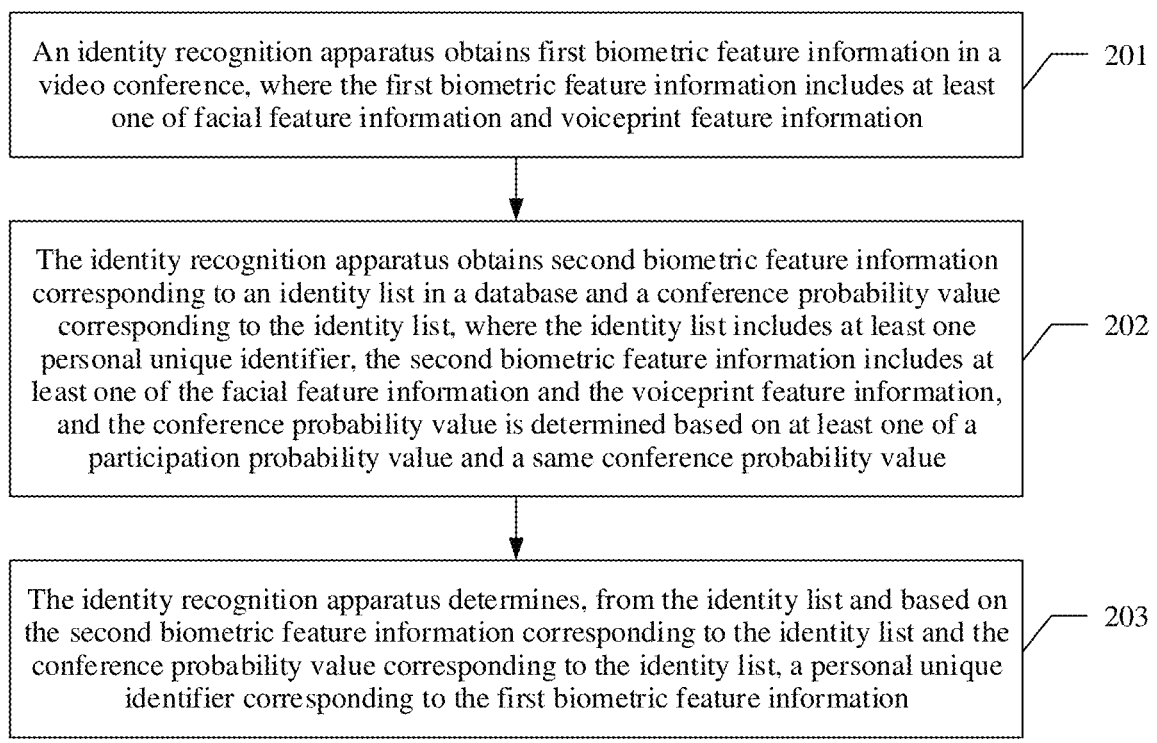
FIG. 2 is a schematic diagram of one embodiment of a method for recognizing an identity in a video conference according to an embodiment.

FIG. 2 is a schematic diagram of one embodiment of a method for recognizing an identity in a video conference according to an embodiment. This embodiment includes the following exemplary processes:

In step 201, an identity recognition apparatus obtains first biometric feature information in a video conference, where the first biometric feature information includes at least one of facial feature information and voiceprint feature information.

The first biometric feature information is biometric feature information of a target participant. In other words, the target participant is a participant whose identity is to be recognized. For example, before recognizing an identity of a participant A, the identity recognition apparatus needs to obtain biometric feature information of the participant A, and obtain facial feature information and voiceprint feature information of the participant A in real time by using an AI camera. The facial feature information is feature information based on a face of a person, includes but is not limited to features such as an eye, a nose, a mouth, an eyebrow, a facial contour, a tooth, an ear, and hair, may further include facial expression information, for example, a smile expression, a sadness expression, and an angry expression, and may further include information about an adornment attached to a face, for example, information about glasses, a hair pin, a hat, and an ear ring. The voiceprint feature information is sound wave spectrum information that carries voice information, where the voiceprint feature information in this embodiment is unrelated to content of speech.

In step 202, the identity recognition apparatus obtains second biometric feature information corresponding to an identity list in a database and a conference probability value corresponding to the identity list, where the identity list includes at least one PUID, the second biometric feature information includes at least one of facial feature information and voiceprint feature information, and the conference probability value is determined based on at least one of a participation probability value and a same conference probability value.

There is a one-to-one correspondence between the PUID and the second biometric feature information, and there is a one-to-one correspondence between the PUID and the conference probability value. In other words, each PUID has corresponding facial feature information, corresponding voiceprint feature information, and a corresponding conference probability value. However, the second biometric feature information corresponding to the PUID stored in the database may be the facial feature information, may be the voiceprint feature information, or may be the facial feature information and the voiceprint feature information. This is not specifically limited herein.

The conference probability value is determined by a terminal or a server based on at least one of the participation probability value and the same conference probability value. The participation probability value indicates a probability that a user participates in a conference, and the same conference probability value indicates a probability that the user participates in a same conference with another user. In other words, the conference probability value may be the participation probability value or the same conference probability value, or the conference probability value is a result determined in a preset manner by using the participation probability value and the same conference probability value. The preset manner includes one of an arithmetic average value, a weighted average value, and a maximum value. For example, an arithmetic average value of the participation probability value and the same conference probability value is used as the conference probability value. For another example, a weighted average value of the participation probability value and the same conference probability value is used as the conference probability value. For another example, the participation probability value and the same conference probability value are compared, if the participation probability value is larger, the participation probability value is used as the conference probability value, and if the same conference probability value is larger, the same conference probability value is used as the conference probability value.

The participation probability value is determined based on at least one of historical participation information and current participation information. In other words, the participation probability value may be determined based on the historical participation information or the current participation information, or the participation probability value may be a result determined in a preset manner based on a probability value that is respectively determined by using the historical participation information and the current participation information. The preset manner includes one of an arithmetic average value, a weighted average value, and a maximum value. The current participation information includes at least one of location information of a conference room, conference notification information, personnel location information, and conference recording information, the conference recording information includes identity information corresponding to a PUID, and the identity information corresponding to the PUID includes at least one of a name, a nickname, a job title, and an employee ID. The historical participation information includes at least one of location information of a conference room, conference notification information, personnel location information, and conference recording information, the conference recording information includes identity information corresponding to a PUID, and the identity information corresponding to the PUID includes at least one of a name, a nickname, a job title, and an employee ID.

In an example in which the participation probability value is determined based on the current participation information, assuming that the current participation information includes location information of a conference room, conference notification information, personnel location information, and conference recording information, where a proportion of each of the location information of the conference room, the conference notification information, the personnel location information, and the conference recording information may be preset in advance based on a degree of impact on the participation probability value. If the conference notification information has a relatively high degree of impact on the participation probability value, the preset proportion of the conference notification information may be relatively large. If the location information of the conference room has a relatively low degree of impact on the participation probability value, the preset proportion of the location information of the conference room may be relatively small. This may be determined based on an actual situation, and is not specifically limited herein. In an example in which the proportion of the location information of the conference room is ¼, the proportion of the conference notification information is ¼, the proportion of the personnel location information is ¼, and the proportion of the conference recording information is ¼, assuming that identity information corresponding to a PUID A in the database appears in the conference notification information, the ¼ proportion of the conference notification information remains unchanged. If the database does not include the location information of the conference room and the personnel location information that are included in the current participation information and that are corresponding to the PUID A, the proportion of the location information of the conference room and the proportion of the personnel location information are both 0. If the identity information corresponding to the PUID A in the database appears in the conference recording information, the ¼ proportion of the conference recording information remains unchanged, and therefore the participation probability value is equal to ½, a sum of the ¼ proportion of the conference notification information and the ¼ proportion of the conference recording information. Certainly, the participation probability value may also be dynamically adjusted at any time based on a change of an impact factor of the participation probability value. In an exemplary implementation process, there are many manners in which the participation probability value is determined based on at least one of the historical participation information and the current participation information, the foregoing is only one of implementations, and another implementation is not specifically limited herein. Likewise, for a manner in which the participation probability value is determined based on the historical participation information, refer to the foregoing example. Details are not described herein again.

The same conference probability value is determined based on at least one of historical same conference information and current same conference information. In other words, the same conference probability value may be determined based on the historical same conference information or the current same conference information, or the same conference probability value may be a result determined in a preset manner based on a probability value that is respectively determined by using the historical same conference information and the current same conference information. The preset manner includes one of an arithmetic average value, a weighted average value, and a maximum value. The current same conference information includes at least one of conference notification information, interpersonal relationship information, and personal location information. The historical same conference information includes at least one of conference notification information, interpersonal relationship information, and personal location information.

In an example in which the same conference probability value is determined based on the current same conference information, assuming that the current same conference information includes conference notification information, interpersonal relationship information, and personnel location information, where a proportion of each of the conference notification information, the interpersonal relationship information, and the personnel location information may be preset in advance based on a degree of impact on the same conference probability value. If the conference notification information has a relatively high degree of impact on the same conference probability value, the preset proportion of the conference notification information may be relatively large. If the personnel location information has a relatively low degree of impact on the same conference probability value, the preset proportion of the personnel location information may be relatively small. This may be determined based on an actual situation, and is not specifically limited herein. In an example in which the proportion of the conference notification information is ⅓, the proportion of the interpersonal relationship information is ⅓, and the proportion of the personnel location information is ⅓, if a same conference probability value corresponding to a PUID B in the database needs to be determined, assuming that information about a PUID C appears in the conference notification information, the ⅓ proportion of the conference notification information remains unchanged, where a user corresponding to the PUID C and a user corresponding to the PUID B once participated in a same conference. If the PUID B has no association relationship with any PUID in a current conference, the proportion of the interpersonal relationship information is 0. If location information that is in a conference room and that is of any PUID that has participated in a same conference as the PUID B does not appear in the current conference, the proportion of the personnel location information is 0, and therefore the same conference probability value is equal to the ⅓ proportion of the conference notification information. Certainly, the same conference probability value may also be dynamically adjusted at any time based on a change of an impact factor of the same conference probability value. In an exemplary implementation process, there are many manners in which the same conference probability value is determined based on at least one of the historical same conference information and the current same conference information, the foregoing is only one of implementations, and another implementation is not specifically limited herein. Likewise, for a manner in which the same conference probability value is determined based on the historical same conference information, refer to the foregoing example. Details are not described herein again.

In another implementation process, the participation probability value is determined based on at least one of a participation statistical probability value and a participation calculation probability value. In other words, the participation probability value may be the participation statistical probability value or the participation calculation probability value, or the participation probability value is a result determined in a preset manner based on the participation statistical probability value and the participation calculation probability value. The preset manner includes one of an arithmetic average value, a weighted average value, and a maximum value. The participation calculation probability value is determined based on at least one of a location relationship calculation probability value and a conference notification calculation probability value. In other words, the participation calculation probability value may be the location relationship calculation probability value or the conference notification calculation probability value, or the participation calculation probability value is a result determined in a preset manner based on the location relationship calculation probability value and the conference notification calculation probability value. The preset manner includes one of an arithmetic average value, a weighted average value, and a maximum value. The participation statistical probability value is determined based on the historical participation information, and the location relationship calculation probability value and the conference notification calculation probability value are determined based on the current participation information.

In an example in which the participation probability value is determined in a preset manner based on the participation statistical probability value and the participation calculation probability value, assuming that the preset manner is a weighted average value, in an exemplary implementation process, the terminal or the server presets a weight of the participation statistical probability value and a weight of the participation calculation probability value in advance based on a degree of impact on the participation probability value. If the weight of the participation statistical probability value is 0.8, and the weight of the participation calculation probability value is 0.2, the participation probability value=the participation statistical probability value*0.8+the participation calculation probability value*0.2.

In another implementation process, the same conference probability value is determined based on at least one of a same conference statistical probability value and a same conference calculation probability value. In other words, the same conference probability value may be the same conference statistical probability value or the same conference calculation probability value, or the same conference probability value is a result determined in a preset manner based on the same conference statistical probability value and the same conference calculation probability value. The preset manner includes one of an arithmetic average value, a weighted average value, and a maximum value. The same conference calculation probability value is determined based on at least one of an organizational relationship calculation probability value and a friend relationship calculation probability value. In other words, the same conference calculation probability value may be the organizational relationship calculation probability value or the friend relationship calculation probability value, or the same conference calculation probability value is a result determined in a preset manner based on the organizational relationship calculation probability value and the friend relationship calculation probability value. The preset manner includes one of an arithmetic average value, a weighted average value, and a maximum value. The same conference statistical probability value is determined based on the historical participation information, and the organizational relationship calculation probability value and the friend relationship calculation probability value are determined based on the current participation information.

In an example in which the same conference probability value is determined in a preset manner based on the same conference statistical probability value and the same conference calculation probability value, assuming that the preset manner is an arithmetic average value, the same conference probability value=(the same conference statistical probability value+the same conference calculation probability value)/2.

In step 203, the identity recognition apparatus determines, from the identity list and based on the second biometric feature information corresponding to the identity list and the conference probability value corresponding to the identity list, a PUID corresponding to the first biometric feature information.

In an exemplary implementation process, there are many manners in which the identity recognition apparatus determines, from the identity list, the PUID corresponding to the first biometric feature information. Because the second biometric feature information includes at least one of the facial feature information and the voiceprint feature information, the identity recognition apparatus may determine, based on the facial feature information and the conference probability value, the PUID corresponding to the first biometric feature information, or the identity recognition apparatus may determine, based on the voiceprint feature information and the conference probability value, the PUID corresponding to the first biometric feature information, or the identity recognition apparatus may determine, based on the facial feature information, the voiceprint feature information, and the conference probability value, the PUID corresponding to the first biometric feature information. This is not specifically limited herein.

Based on the embodiment shown in FIG. 2, the following describes in more detail the processes of the method for recognizing an identity in a video conference.

Figure 3:
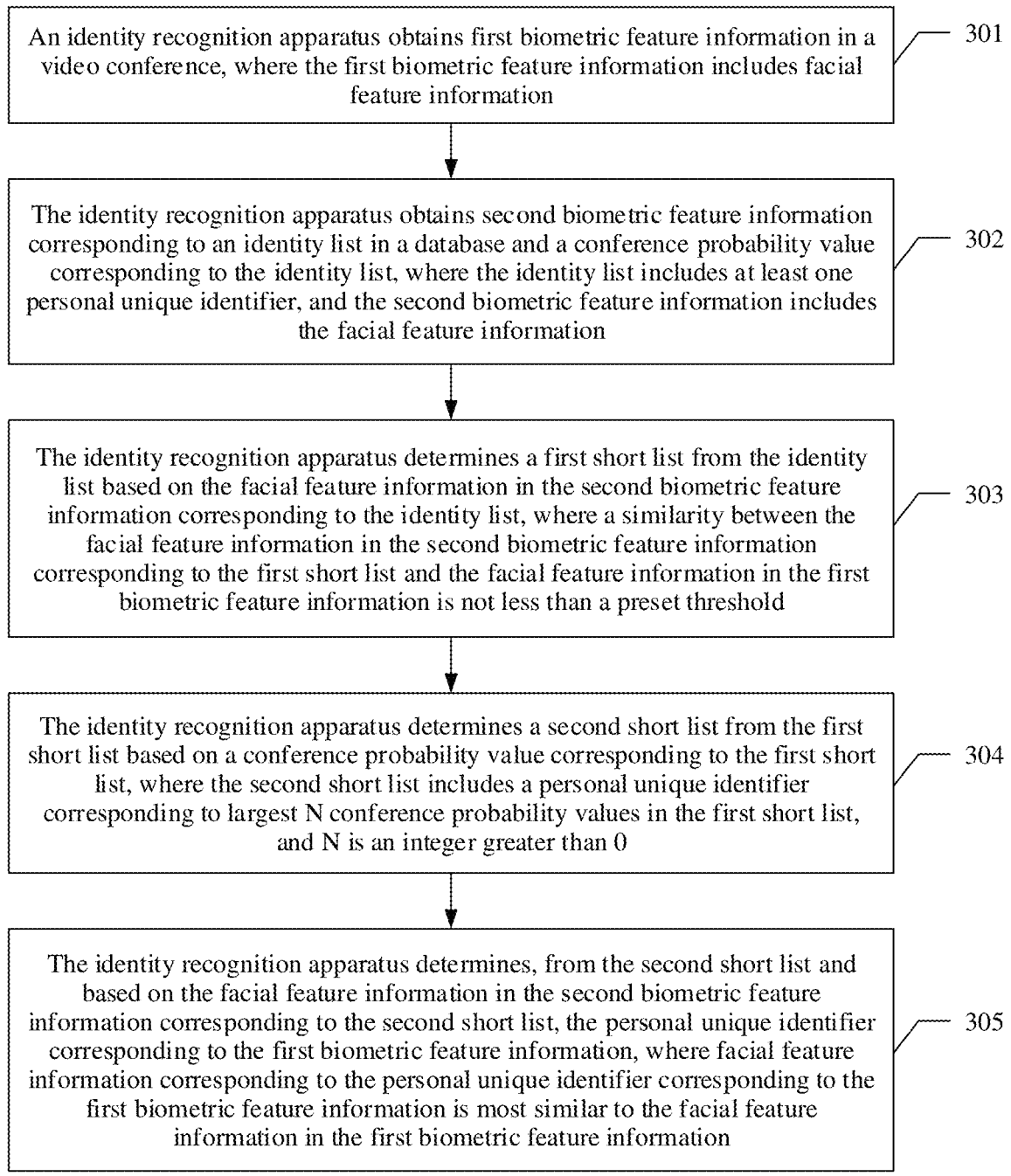
FIG. 3 is a schematic diagram of another embodiment of a method for recognizing an identity in a video conference according to an embodiment.

FIG. 3 is a schematic diagram of another embodiment of the method for recognizing an identity in a video conference according to an embodiment. This embodiment includes the following exemplary processes:

In step 301, the identity recognition apparatus obtains the first biometric feature information in the video conference, where the first biometric feature information includes the facial feature information.

In step 302, the identity recognition apparatus obtains the second biometric feature information corresponding to the identity list in the database and the conference probability value corresponding to the identity list, where the identity list includes at least one PUID, and the second biometric feature information includes the facial feature information.

In step 303, the identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a preset threshold.

In step 304, the identity recognition apparatus determines a second short list from the first short list based on a conference probability value corresponding to the first short list, where the second short list includes a PUID corresponding to largest N conference probability values in the first short list, and N is an integer greater than 0.

In an exemplary implementation process, there are many manners in which the identity recognition apparatus determines the second short list from the first short list based on the conference probability value corresponding to the first short list, for example, a manner in which cluster analysis is used, a manner in which M maximum values are selected, and a manner in which a conference probability value is greater than a preset threshold, where M is an integer greater than 0. This is not specifically limited herein.

Using the manner in which cluster analysis is used as an example, it is assumed that the first short list includes six PUIDs: A, B, C, D, E, and F, where a conference probability value corresponding to A is 0.8, a conference probability value corresponding to B is 0.3, a conference probability value corresponding to C is 0.4, a conference probability value corresponding to D is 0.85, a conference probability value corresponding to E is 0.9, and a conference probability value corresponding to F is 0.2. Through cluster analysis, A, D, and E are classified into one category, and B, C, and F are classified into one category. Because corresponding conference probability values in the category of A, D, and E are the largest, A, D, and E are determined as the second short list.

Using the manner in which M maximum values are selected as an example, it is assumed that the first short list includes seven PUIDs: A, B, C, D, E, F, and G, where a conference probability value corresponding to A is 0.8, a conference probability value corresponding to B is 0.3, a conference probability value corresponding to C is 0.4, a conference probability value corresponding to D is 0.85, a conference probability value corresponding to E is 0.9, a conference probability value corresponding to F is 0.2, and a conference probability value corresponding to G is 0.85. If M is 3, the largest three conference probability values are respectively the conference probability value 0.85 corresponding to D, the conference probability value 0.9 corresponding to E, and the conference probability value 0.85 corresponding to G, and D, E, and G are determined as the second short list.

Using the manner in which a conference probability value is greater than a preset threshold as an example, it is assumed that the first short list includes eight PUIDs: A, B, C, D, E, F, G, and H, where a conference probability value corresponding to A is 0.8, a conference probability value corresponding to B is 0.3, a conference probability value corresponding to C is 0.4, a conference probability value corresponding to D is 0.85, a conference probability value corresponding to E is 0.9, a conference probability value corresponding to F is 0.2, a conference probability value corresponding to G is 0.85, and a conference probability value corresponding to H is 0.6. If the preset threshold is 0.7, only the conference probability values of A, D, E, and G are greater than the preset threshold, and A, D, E, and G are determined as the second short list.

In an exemplary implementation process, a larger conference probability value indicates a higher probability that an identity is recognized. Therefore, to improve a conference probability value corresponding to a PUID, there are the following possible implementations:

In a possible implementation, the first short list further includes the identity information corresponding to the PUID. Before determining the second short list from the first short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the first short list, and improves a conference probability value of a PUID that is in the first short list and that has the mentioned identity information.

For example, the first short list further includes a name of each candidate user. The terminal sends the conference recording information during the current conference to the voice recognition server, receives the conversation text of the conference recording information from the voice recognition server, determines, based on the conversation text, a name mentioned during the current conference, and counts a quantity of times that each name is mentioned. Then, the terminal compares a name mentioned in a conversation with a name in the first short list, and temporarily improves a conference probability value of a candidate user that is in the first short list and that is the same as the name mentioned in the conversation. A larger quantity of times that a name is mentioned indicates that the conference probability value is improved more, and the terminal clears an improved part of the conference probability value after the conference ends.

In a possible implementation, the first short list further includes the identity information corresponding to the PUID. Before determining the second short list from the first short list, the identity recognition apparatus sends conference recording information during a current conference to a voice recognition server, receives identity information that is determined based on the conference recording information and that is from the voice recognition server, compares the determined identity information with identity information corresponding to the first short list, and improves a conference probability value of a PUID that is in the first short list and that has the determined identity information.

For example, the first short list further includes a name of each candidate user. The terminal sends conference recording information during the current conference to the voice recognition server, so that the voice recognition server determines a conversation text based on the conference recording information, determines, based on the conversation text, a name mentioned during the current conference, and counts a quantity of times that each name is mentioned. The terminal receives the name mentioned during the current conference from the voice recognition server, compares a name mentioned in a conversation with a name in the first short list, and sends, to a probability server, a PUID corresponding to a name that is in the first short list and that is the same as the name mentioned in the conversation, so that the probability server temporarily improves a conference probability value of a candidate user that is in the first short list and that is the same as the name mentioned in the conversation, and clears an improved part of the conference probability value after the conference ends, where a larger quantity of times that a name is mentioned indicates that the conference probability value is improved more.

In step 305, the identity recognition apparatus determines, from the second short list and based on the facial feature information in the second biometric feature information corresponding to the second short list, the PUID corresponding to the first biometric feature information, where facial feature information corresponding to the PUID corresponding to the first biometric feature information is most similar to the facial feature information in the first biometric feature information.

Figure 4:
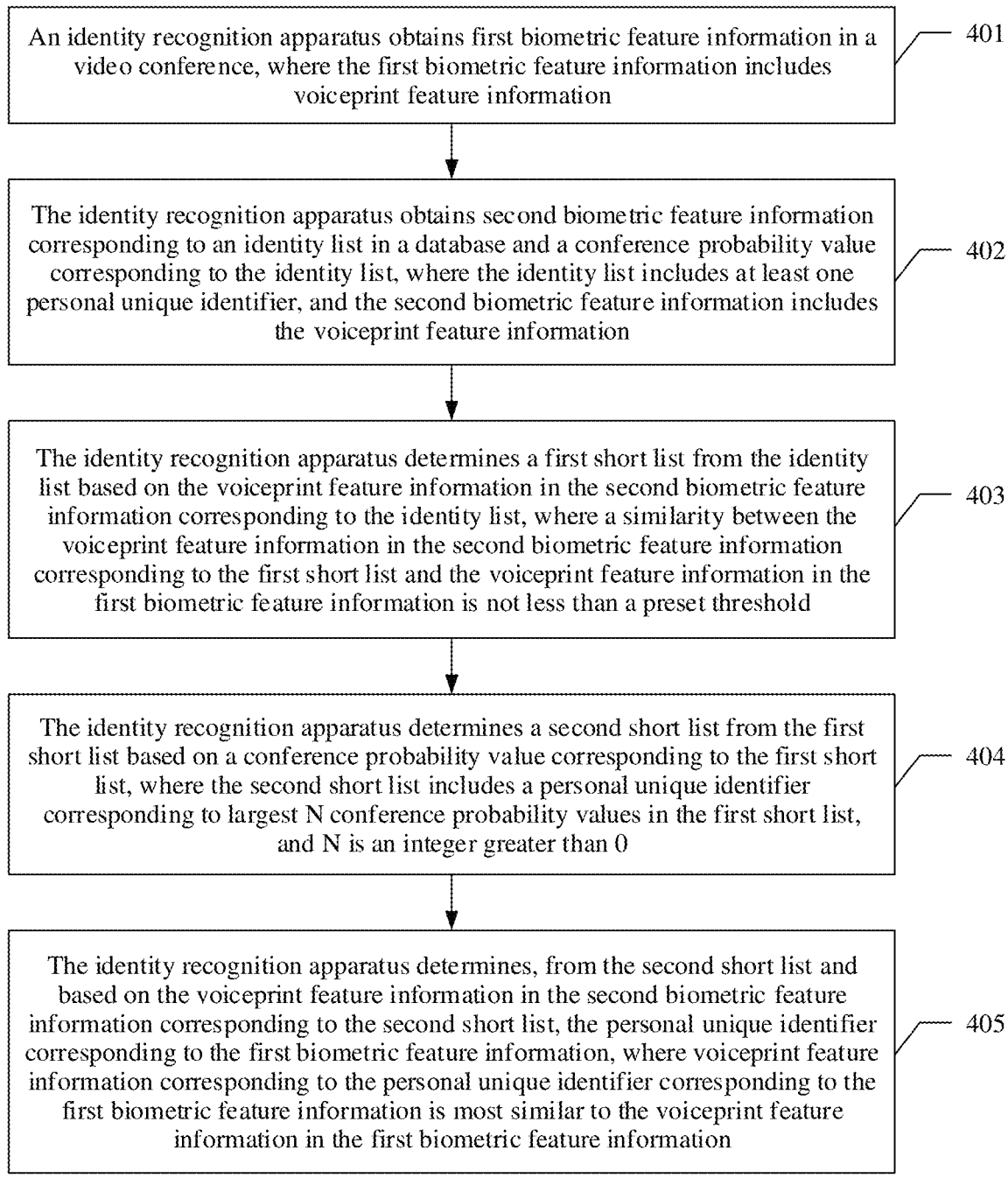
FIG. 4 is a schematic diagram of another embodiment of a method for recognizing an identity in a video conference according to an embodiment.

FIG. 4 is a schematic diagram of another embodiment of the method for recognizing an identity in a video conference according to an embodiment. This embodiment includes the following exemplary processes:

In step 401, the identity recognition apparatus obtains the first biometric feature information in the video conference, where the first biometric feature information includes the voiceprint feature information.

In step 402, the identity recognition apparatus obtains the second biometric feature information corresponding to the identity list in the database and the conference probability value corresponding to the identity list, where the identity list includes at least one PUID, and the second biometric feature information includes the voiceprint feature information.

In step 403, the identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a preset threshold.

In step 404, the identity recognition apparatus determines a second short list from the first short list based on a conference probability value corresponding to the first short list, where the second short list includes a PUID corresponding to largest N conference probability values in the first short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the first short list further includes the identity information corresponding to the PUID. Before determining the second short list from the first short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the first short list, and improves a conference probability value of a PUID that is in the first short list and that has the mentioned identity information.

In a possible implementation, the first short list further includes the identity information corresponding to the PUID. Before determining the second short list from the first short list, the identity recognition apparatus sends conference recording information during a current conference to a voice recognition server, receives identity information that is determined based on the conference recording information and that is from the voice recognition server, compares the determined identity information with identity information corresponding to the first short list, and improves a conference probability value of a PUID that is in the first short list and that has the determined identity information.

In step 405, the identity recognition apparatus determines, from the second short list and based on the voiceprint feature information in the second biometric feature information corresponding to the second short list, the PUID corresponding to the first biometric feature information, where voiceprint feature information corresponding to the PUID corresponding to the first biometric feature information is most similar to the voiceprint feature information in the first biometric feature information.

Figure 5:
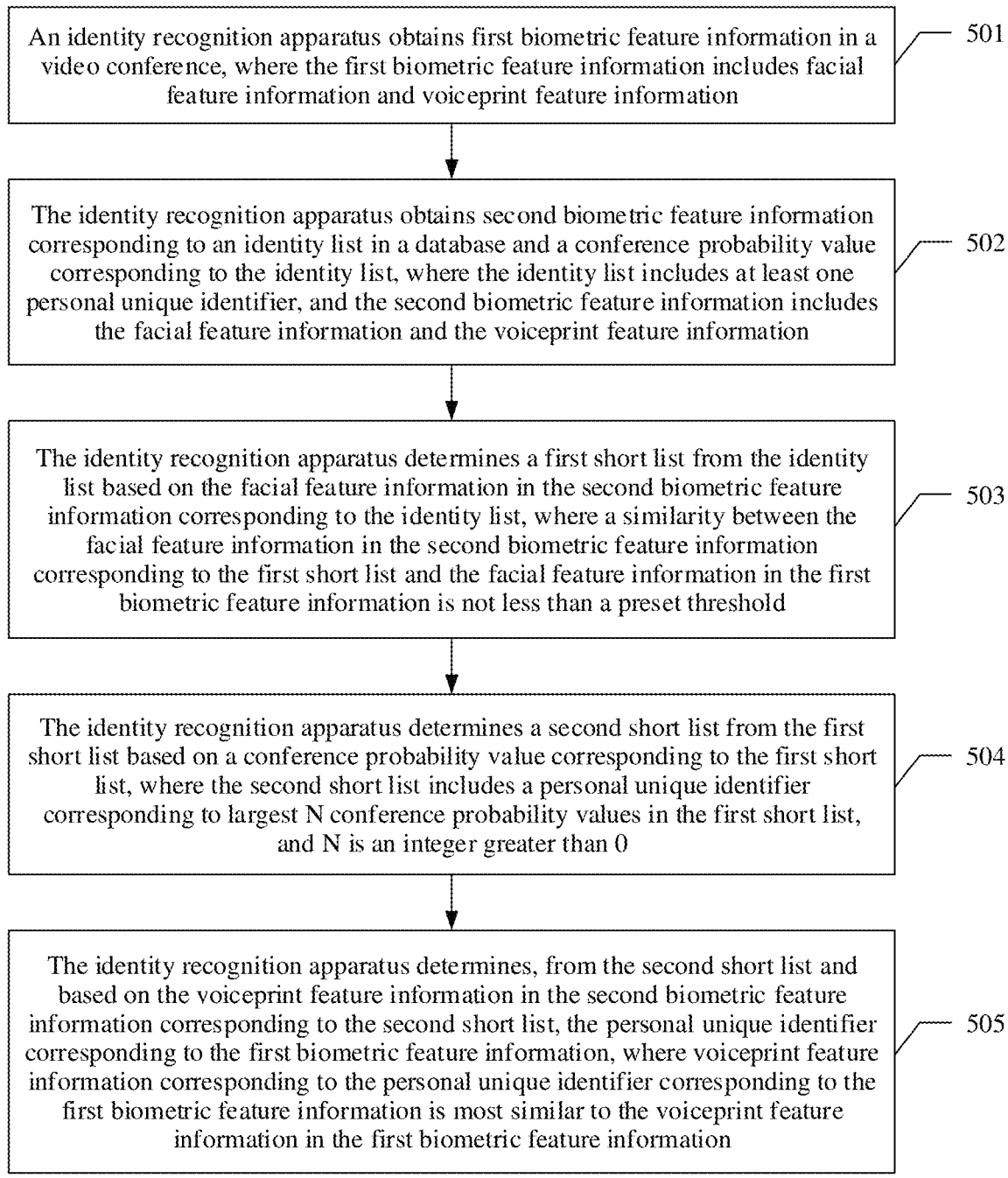
FIG. 5 is a schematic diagram of another embodiment of a method for recognizing an identity in a video conference according to an embodiment.

FIG. 5 is a schematic diagram of another embodiment of the method for recognizing an identity in a video conference according to an embodiment. This embodiment includes the following exemplary processes:

In step 501, the identity recognition apparatus obtains the first biometric feature information in the video conference, where the first biometric feature information includes the facial feature information and the voiceprint feature information.

In step 502, the identity recognition apparatus obtains the second biometric feature information corresponding to the identity list in the database and the conference probability value corresponding to the identity list, where the identity list includes at least one PUID, and the second biometric feature information includes the facial feature information and the biometric feature information.

In step 503, the identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a preset threshold.

In step 504, the identity recognition apparatus determines a second short list from the first short list based on a conference probability value corresponding to the first short list, where the second short list includes a PUID corresponding to largest N conference probability values in the first short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the first short list further includes the identity information corresponding to the PUID. Before determining the second short list from the first short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the first short list, and improves a conference probability value of a PUID that is in the first short list and that has the mentioned identity information.

In a possible implementation, the first short list further includes the identity information corresponding to the PUID. Before determining the second short list from the first short list, the identity recognition apparatus sends conference recording information during a current conference to a voice recognition server, receives identity information that is determined based on the conference recording information and that is from the voice recognition server, compares the determined identity information with identity information corresponding to the first short list, and improves a conference probability value of a PUID that is in the first short list and that has the determined identity information.

In step 505, the identity recognition apparatus determines, from the second short list and based on the voiceprint feature information in the second biometric feature information corresponding to the second short list, the PUID corresponding to the first biometric feature information, where voiceprint feature information corresponding to the PUID corresponding to the first biometric feature information is most similar to the voiceprint feature information in the first biometric feature information.

Figure 6:
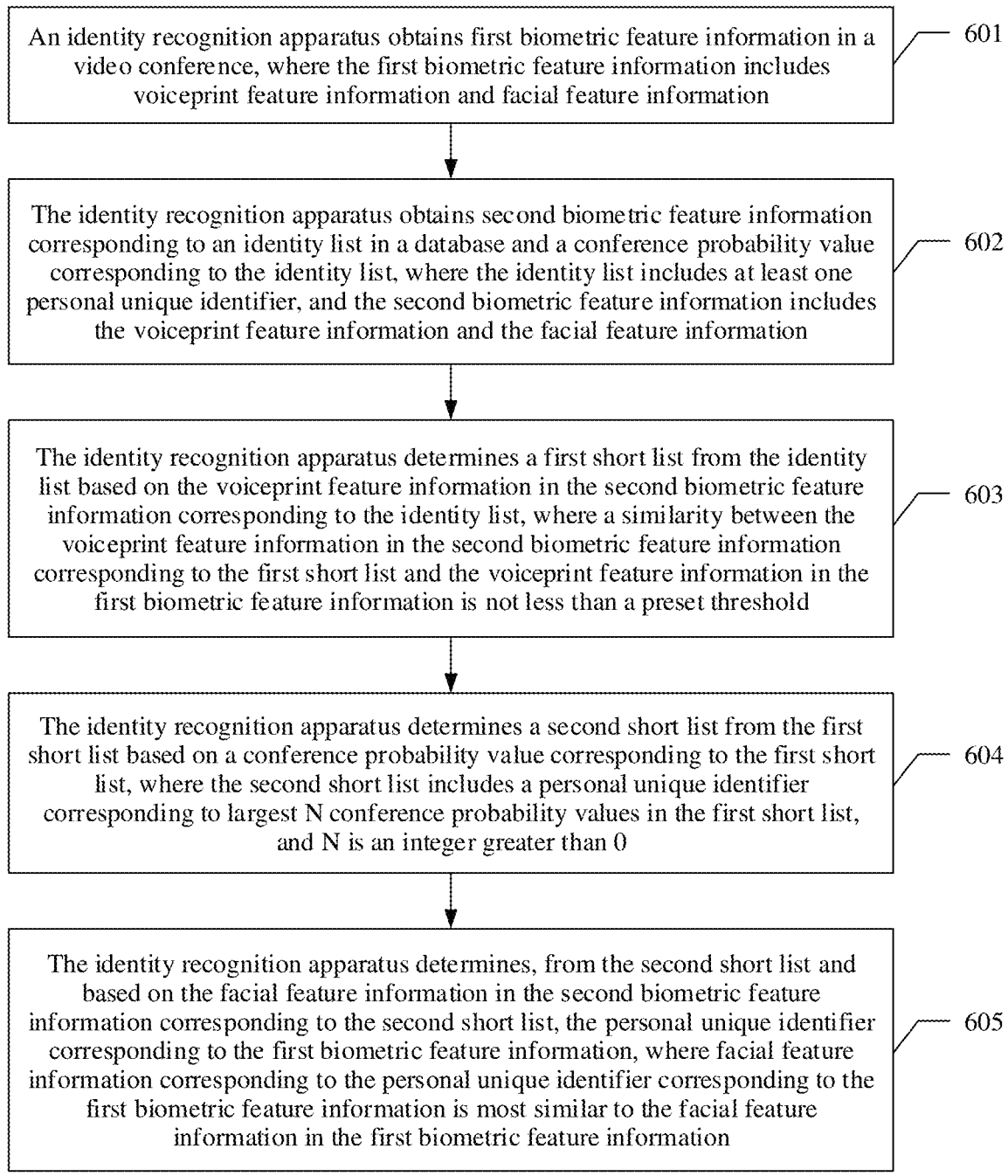
FIG. 6 is a schematic diagram of another embodiment of a method for recognizing an identity in a video conference according to an embodiment.

FIG. 6 is a schematic diagram of another embodiment of the method for recognizing an identity in a video conference according to an embodiment. This embodiment includes the following exemplary processes:

In step 601, the identity recognition apparatus obtains the first biometric feature information in the video conference, where the first biometric feature information includes the voiceprint feature information and the facial feature information.

In step 602, the identity recognition apparatus obtains the second biometric feature information corresponding to the identity list in the database and the conference probability value corresponding to the identity list, where the identity list includes at least one PUID, and the second biometric feature information includes the voiceprint feature information and the facial feature information.

In step 603, the identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a preset threshold.

In step 604, the identity recognition apparatus determines a second short list from the first short list based on a conference probability value corresponding to the first short list, where the second short list includes a PUID corresponding to largest N conference probability values in the first short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the first short list further includes the identity information corresponding to the PUID. Before determining the second short list from the first short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the first short list, and improves a conference probability value of a PUID that is in the first short list and that has the mentioned identity information.

In a possible implementation, the first short list further includes the identity information corresponding to the PUID. Before determining the second short list from the first short list, the identity recognition apparatus sends conference recording information during a current conference to a voice recognition server, receives identity information that is determined based on the conference recording information and that is from the voice recognition server, compares the determined identity information with identity information corresponding to the first short list, and improves a conference probability value of a PUID that is in the first short list and that has the determined identity information.

In step 605, the identity recognition apparatus determines, from the second short list and based on the facial feature information in the second biometric feature information corresponding to the second short list, the PUID corresponding to the first biometric feature information, where facial feature information corresponding to the PUID corresponding to the first biometric feature information is most similar to the facial feature information in the first biometric feature information.

Figure 7:
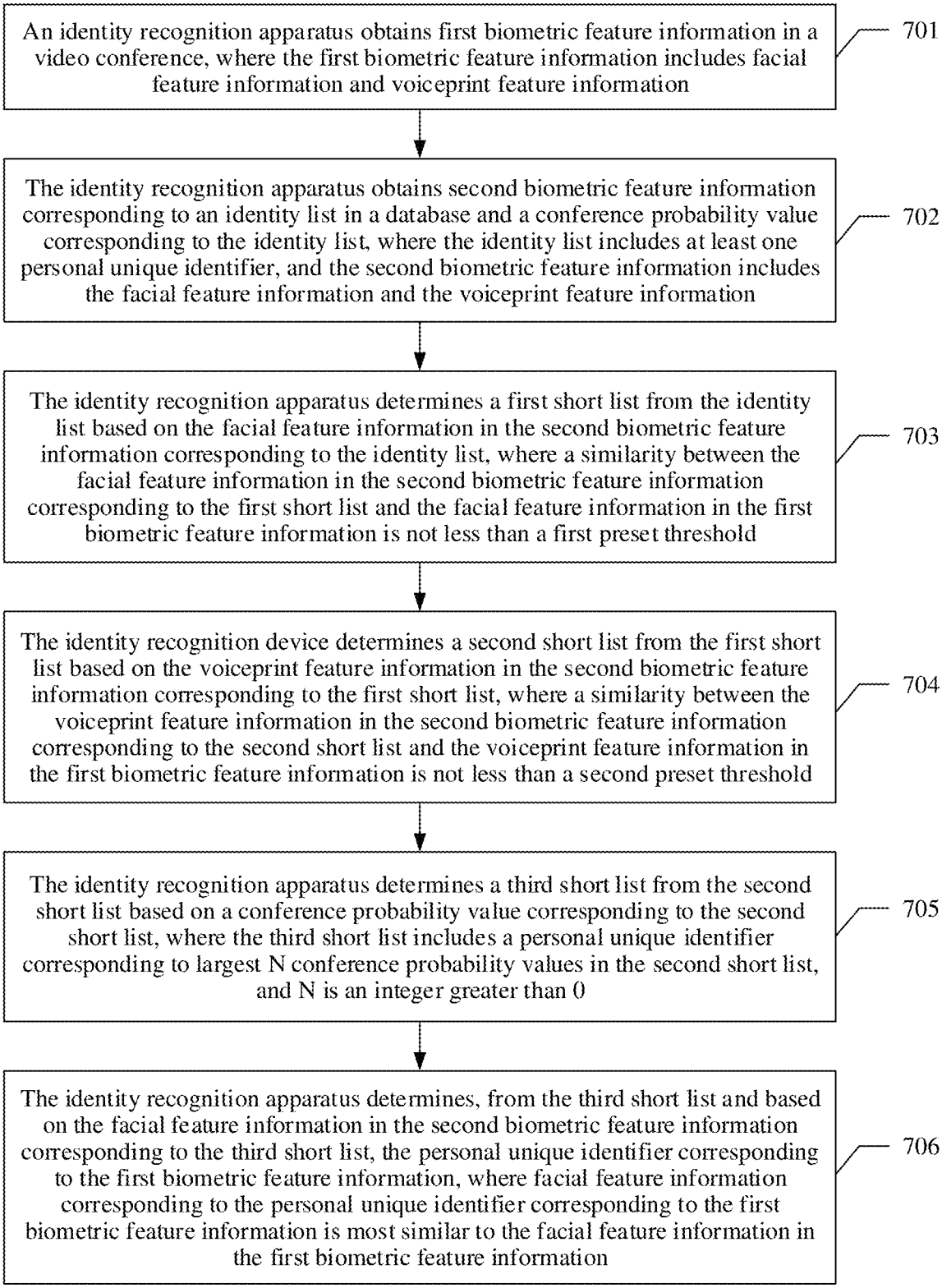
FIG. 7 is a schematic diagram of another embodiment of a method for recognizing an identity in a video conference according to an embodiment.

FIG. 7 is a schematic diagram of another embodiment of the method for recognizing an identity in a video conference according to an embodiment. This embodiment includes the following exemplary processes:

In step 701, the identity recognition apparatus obtains the first biometric feature information in the video conference, where the first biometric feature information includes the facial feature information and the voiceprint feature information.

In step 702, the identity recognition apparatus obtains the second biometric feature information corresponding to the identity list in the database and the conference probability value corresponding to the identity list, where the identity list includes at least one PUID, and the second biometric feature information includes the facial feature information and the biometric feature information.

In step 703, the identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a first preset threshold.

In step 704, the identity recognition device determines a second short list from the first short list based on the voiceprint feature information in the second biometric feature information corresponding to the first short list, where a similarity between the voiceprint feature information in the second biometric feature information corresponding to the second short list and the voiceprint feature information in the first biometric feature information is not less than a second preset threshold.

In step 705, the identity recognition apparatus determines a third short list from the second short list based on a conference probability value corresponding to the second short list, where the third short list includes a PUID corresponding to largest N conference probability values in the second short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the second short list further includes the identity information corresponding to the PUID. Before determining the third short list from the second short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the second short list, and improves a conference probability value of a PUID that is in the second short list and that has the mentioned identity information.

In a possible implementation, the second short list further includes the identity information corresponding to the PUID. Before determining the third short list from the second short list, the identity recognition apparatus sends conference recording information during a current conference to a voice recognition server, receives identity information that is determined based on the conference recording information and that is from the voice recognition server, compares the determined identity information with identity information corresponding to the second short list, and improves a conference probability value of a PUID that is in the second short list and that has the determined identity information.

In step 706, the identity recognition apparatus determines, from the third short list and based on the facial feature information in the second biometric feature information corresponding to the third short list, the PUID corresponding to the first biometric feature information, where facial feature information corresponding to the PUID corresponding to the first biometric feature information is most similar to the facial feature information in the first biometric feature information.

Figure 8:
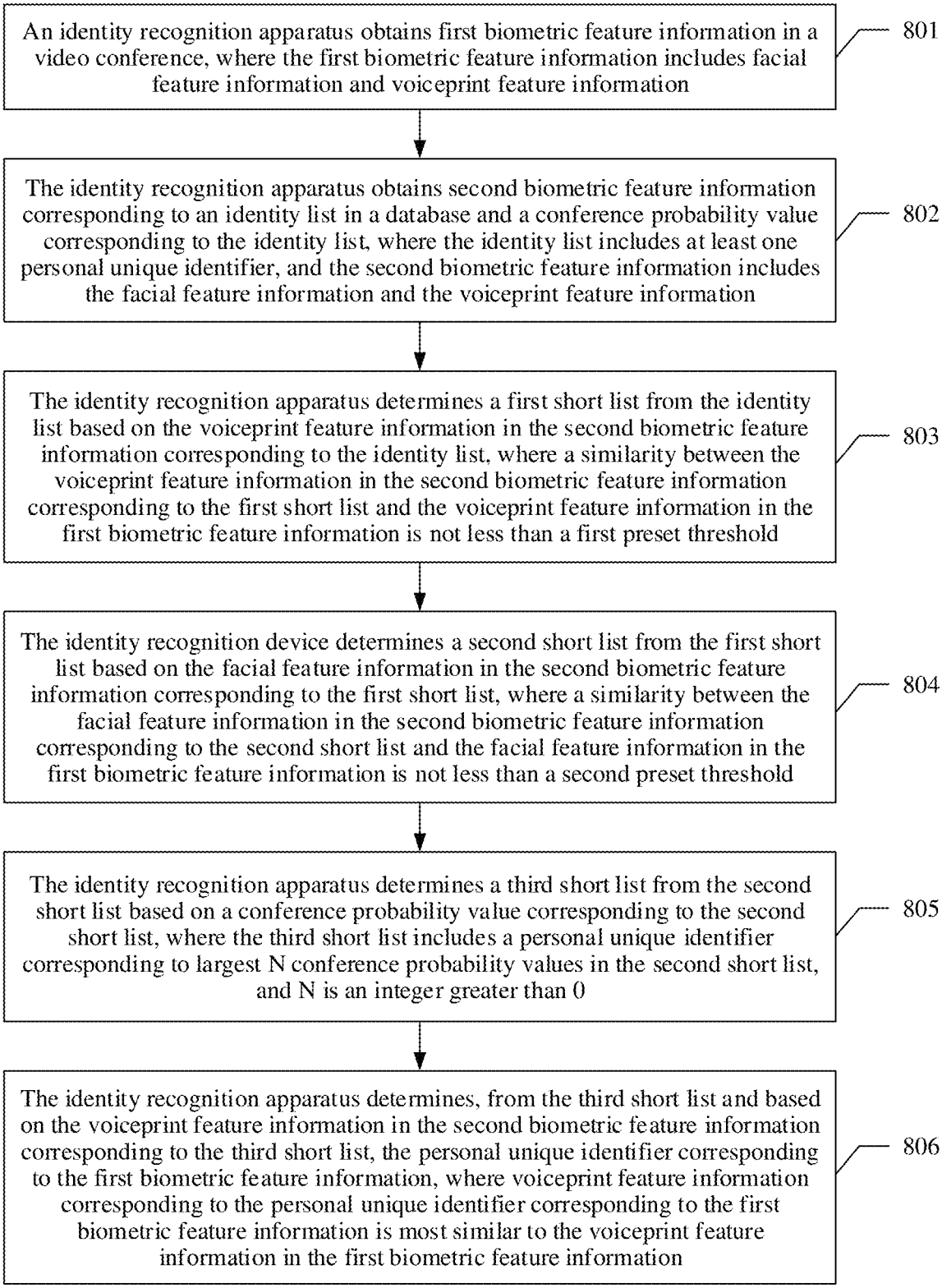
FIG. 8 is a schematic diagram of another embodiment of a method for recognizing an identity in a video conference according to an embodiment.

FIG. 8 is a schematic diagram of another embodiment of the method for recognizing an identity in a video conference according to an embodiment. This embodiment includes the following exemplary processes:

In step 801, the identity recognition apparatus obtains the first biometric feature information in the video conference, where the first biometric feature information includes the facial feature information and the voiceprint feature information.

In step 802, the identity recognition apparatus obtains the second biometric feature information corresponding to the identity list in the database and the conference probability value corresponding to the identity list, where the identity list includes at least one PUID, and the second biometric feature information includes the facial feature information and the biometric feature information.

In step 803, the identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a first preset threshold.

In step 804, the identity recognition device determines a second short list from the first short list based on the facial feature information in the second biometric feature information corresponding to the first short list, where a similarity between the facial feature information in the second biometric feature information corresponding to the second short list and the facial feature information in the first biometric feature information is not less than a second preset threshold.

In step 805, the identity recognition apparatus determines a third short list from the second short list based on a conference probability value corresponding to the second short list, where the third short list includes a PUID corresponding to largest N conference probability values in the second short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the second short list further includes the identity information corresponding to the PUID. Before determining the third short list from the second short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the second short list, and improves a conference probability value of a PUID that is in the second short list and that has the mentioned identity information.

In a possible implementation, the second short list further includes the identity information corresponding to the PUID. Before determining the third short list from the second short list, the identity recognition apparatus sends conference recording information during a current conference to a voice recognition server, receives identity information that is determined based on the conference recording information and that is from the voice recognition server, compares the determined identity information with identity information corresponding to the second short list, and improves a conference probability value of a PUID that is in the second short list and that has the determined identity information.

In step 806, the identity recognition apparatus determines, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information.

Figure 9:
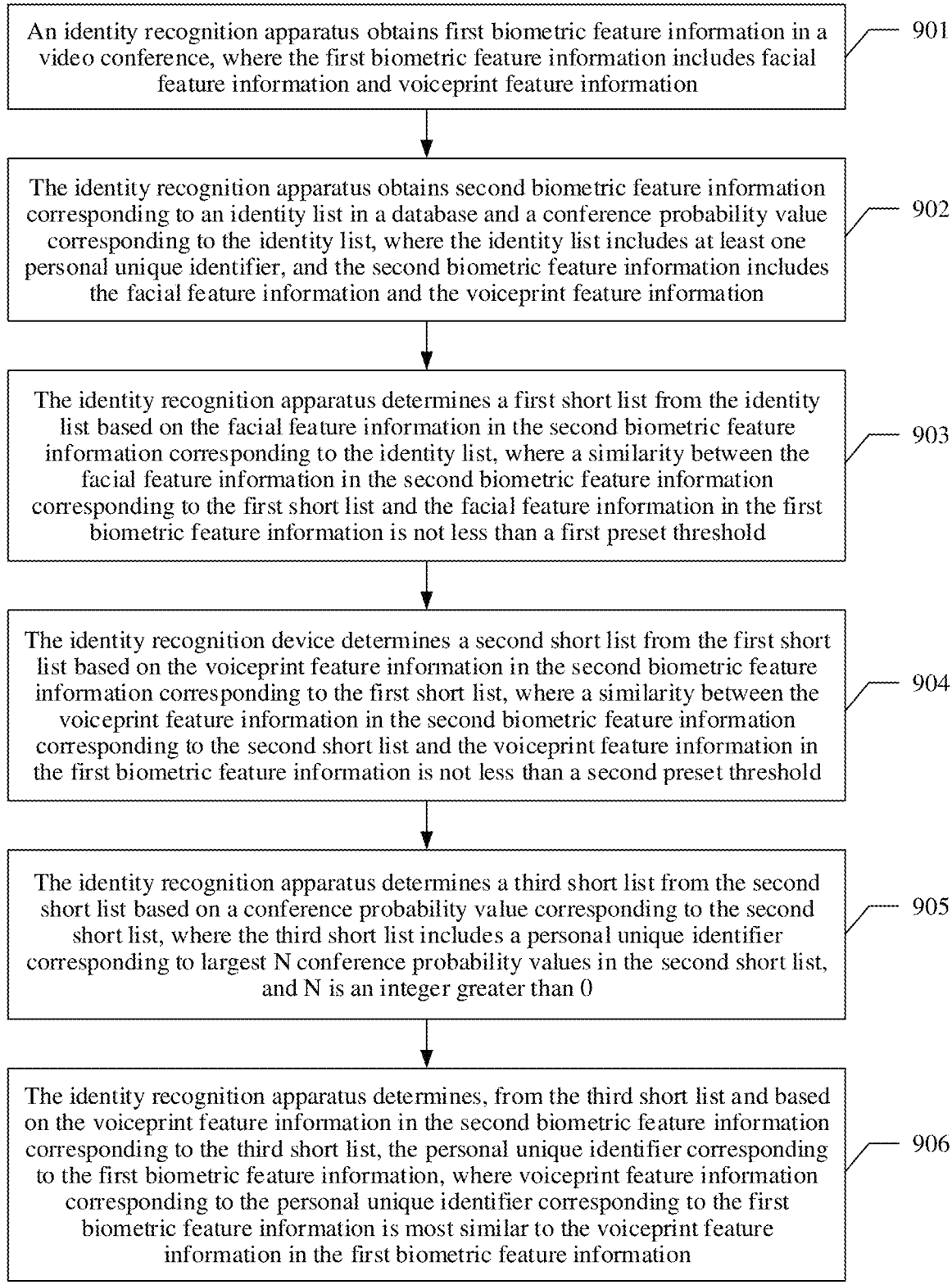
FIG. 9 is a schematic diagram of another embodiment of a method for recognizing an identity in a video conference according to an embodiment.

FIG. 9 is a schematic diagram of another embodiment of the method for recognizing an identity in a video conference according to an embodiment. This embodiment includes the following exemplary processes:

In step 901, the identity recognition apparatus obtains the first biometric feature information in the video conference, where the first biometric feature information includes the facial feature information and the voiceprint feature information.

In step 902, the identity recognition apparatus obtains the second biometric feature information corresponding to the identity list in the database and the conference probability value corresponding to the identity list, where the identity list includes at least one PUID, and the second biometric feature information includes the facial feature information and the biometric feature information.

In step 903, the identity recognition apparatus determines a first short list from the identity list based on the facial feature information in the second biometric feature information corresponding to the identity list, where a similarity between the facial feature information in the second biometric feature information corresponding to the first short list and the facial feature information in the first biometric feature information is not less than a first preset threshold.

In step 904, the identity recognition device determines a second short list from the first short list based on the voiceprint feature information in the second biometric feature information corresponding to the first short list, where a similarity between the voiceprint feature information in the second biometric feature information corresponding to the second short list and the voiceprint feature information in the first biometric feature information is not less than a second preset threshold.

In step 905, the identity recognition apparatus determines a third short list from the second short list based on a conference probability value corresponding to the second short list, where the third short list includes a PUID corresponding to largest N conference probability values in the second short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the second short list further includes the identity information corresponding to the PUID. Before determining the third short list from the second short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the second short list, and improves a conference probability value of a PUID that is in the second short list and that has the mentioned identity information.

In a possible implementation, the second short list further includes the identity information corresponding to the PUID. Before determining the third short list from the second short list, the identity recognition apparatus sends conference recording information during a current conference to a voice recognition server, receives identity information that is determined based on the conference recording information and that is from the voice recognition server, compares the determined identity information with identity information corresponding to the second short list, and improves a conference probability value of a PUID that is in the second short list and that has the determined identity information.

In step 906, the identity recognition apparatus determines, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information.

Figure 10:
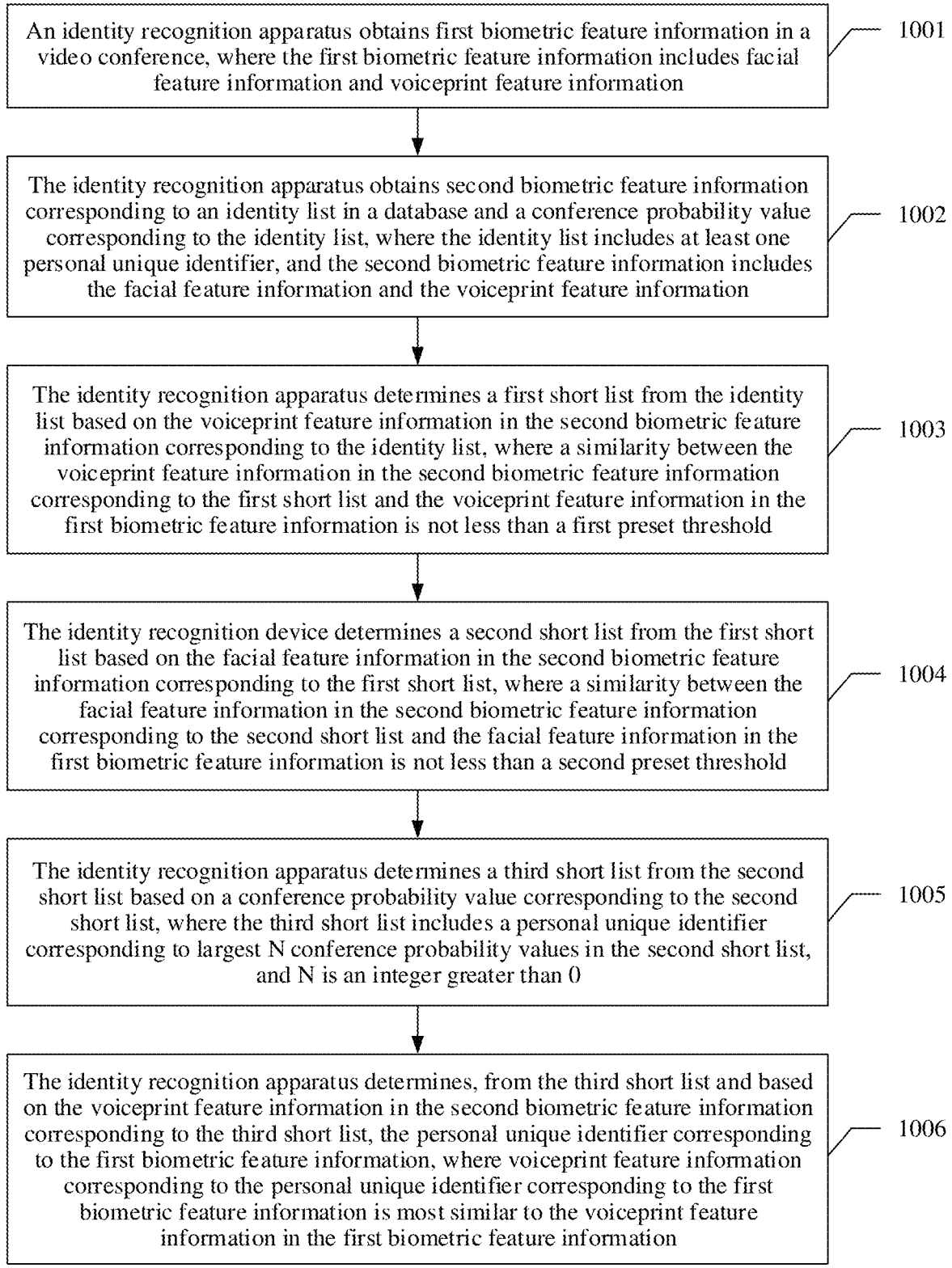
FIG. 10 is a schematic diagram of another embodiment of a method for recognizing an identity in a video conference according to an embodiment.

FIG. 10 is a schematic diagram of another embodiment of the method for recognizing an identity in a video conference according to an embodiment. This embodiment includes the following exemplary processes:

In step 1001, the identity recognition apparatus obtains the first biometric feature information in the video conference, where the first biometric feature information includes the facial feature information and the voiceprint feature information.

In step 1002, the identity recognition apparatus obtains the second biometric feature information corresponding to the identity list in the database and the conference probability value corresponding to the identity list, where the identity list includes at least one PUID, and the second biometric feature information includes the facial feature information and the biometric feature information.

In step 1003, the identity recognition apparatus determines a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a first preset threshold.

In step 1004, the identity recognition device determines a second short list from the first short list based on the facial feature information in the second biometric feature information corresponding to the first short list, where a similarity between the facial feature information in the second biometric feature information corresponding to the second short list and the facial feature information in the first biometric feature information is not less than a second preset threshold.

In step 1005, the identity recognition apparatus determines a third short list from the second short list based on a conference probability value corresponding to the second short list, where the third short list includes a PUID corresponding to largest N conference probability values in the second short list, and N is an integer greater than 0.

In an exemplary implementation process, a larger conference probability value indicates a higher probability that an identity is recognized. Therefore, to improve a conference probability value corresponding to a PUID, there are the following possible implementations:

In a possible implementation, the second short list further includes the identity information corresponding to the PUID. Before determining the third short list from the second short list, the identity recognition apparatus sends conference recording information during a current conference to a voice recognition server, receives a conversation text of the conference recording information from the voice recognition server, determines, based on the conversation text, identity information mentioned during the current conference, compares the mentioned identity information with identity information corresponding to the second short list, and improves a conference probability value of a PUID that is in the second short list and that has the mentioned identity information.

In a possible implementation, the second short list further includes the identity information corresponding to the PUID. Before determining the third short list from the second short list, the identity recognition apparatus sends conference recording information during a current conference to a voice recognition server, receives identity information that is determined based on the conference recording information and that is from the voice recognition server, compares the determined identity information with identity information corresponding to the second short list, and improves a conference probability value of a PUID that is in the second short list and that has the determined identity information.

In step 1006, the identity recognition apparatus determines, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information.

The embodiments shown in FIG. 4 to FIG. 10 relate to content that is the same as or similar to that in the embodiments shown in FIG. 2 and FIG. 3. For details, refer to the embodiments shown in FIG. 2 and FIG. 3. Details are not described herein again.

The following describes, by using an exemplary application scenario, processes of a method for recognizing an identity in a video conference.

Figure 11A:
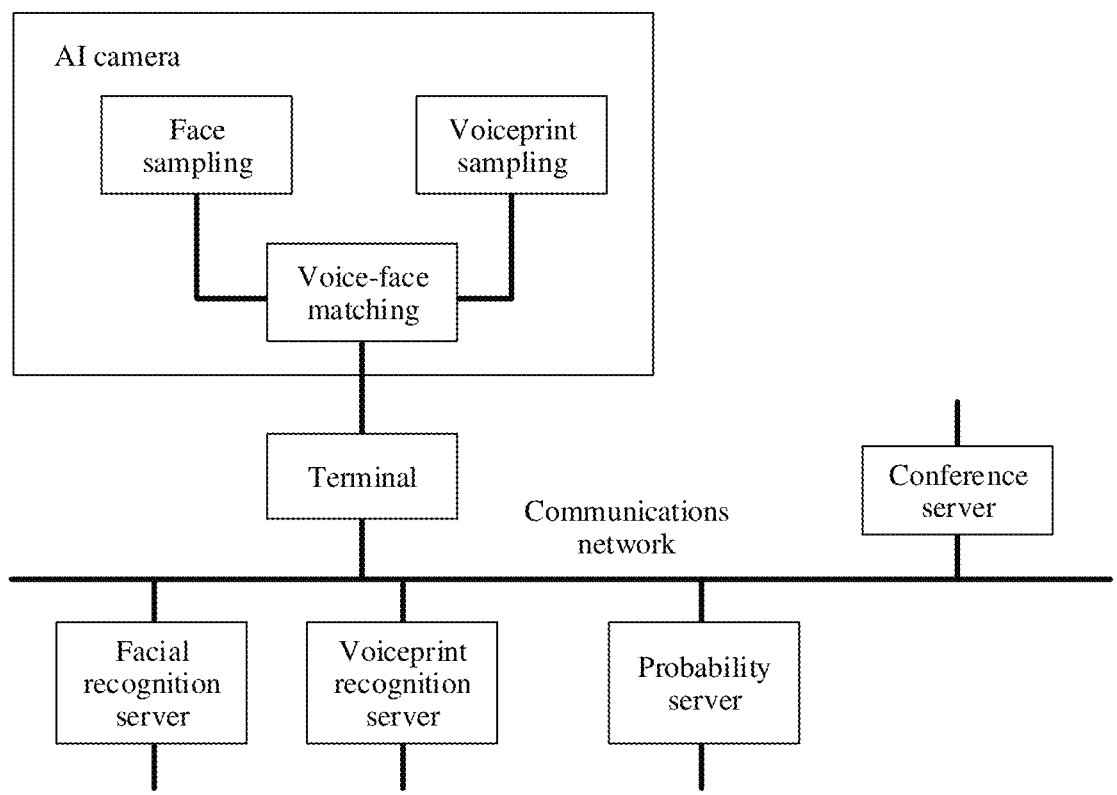
FIG. 11a is a schematic diagram of a structure of an application scenario according to an embodiment.

FIG. 11a is a schematic diagram of a structure of an application scenario according to an embodiment. Massive face databases are pre-stored in a facial recognition server, and a facial recognition algorithm is also a cloud service provided by the facial recognition server. Massive voiceprint databases are pre-stored in a voiceprint recognition server, and a voiceprint recognition algorithm is also a cloud service provided by the voiceprint recognition server. A real-time face sample for facial recognition and a real-time voiceprint sample for voiceprint recognition are captured in real time by an AI camera in user equipment and are subject to voice-face matching. An algorithm for a conference probability value is a cloud service provided by a probability server. A conference server conducts maintenance of a correspondence among a PUID (PUIDPUID), a voiceprint unique identifier (VUID), and a face unique identifier (FUID), and provides a cloud query service for a terminal in the user equipment. The conference server further conducts forwarding and concurrency management of a facial recognition service, a voiceprint recognition service, and a probability service.

Figure 11B:
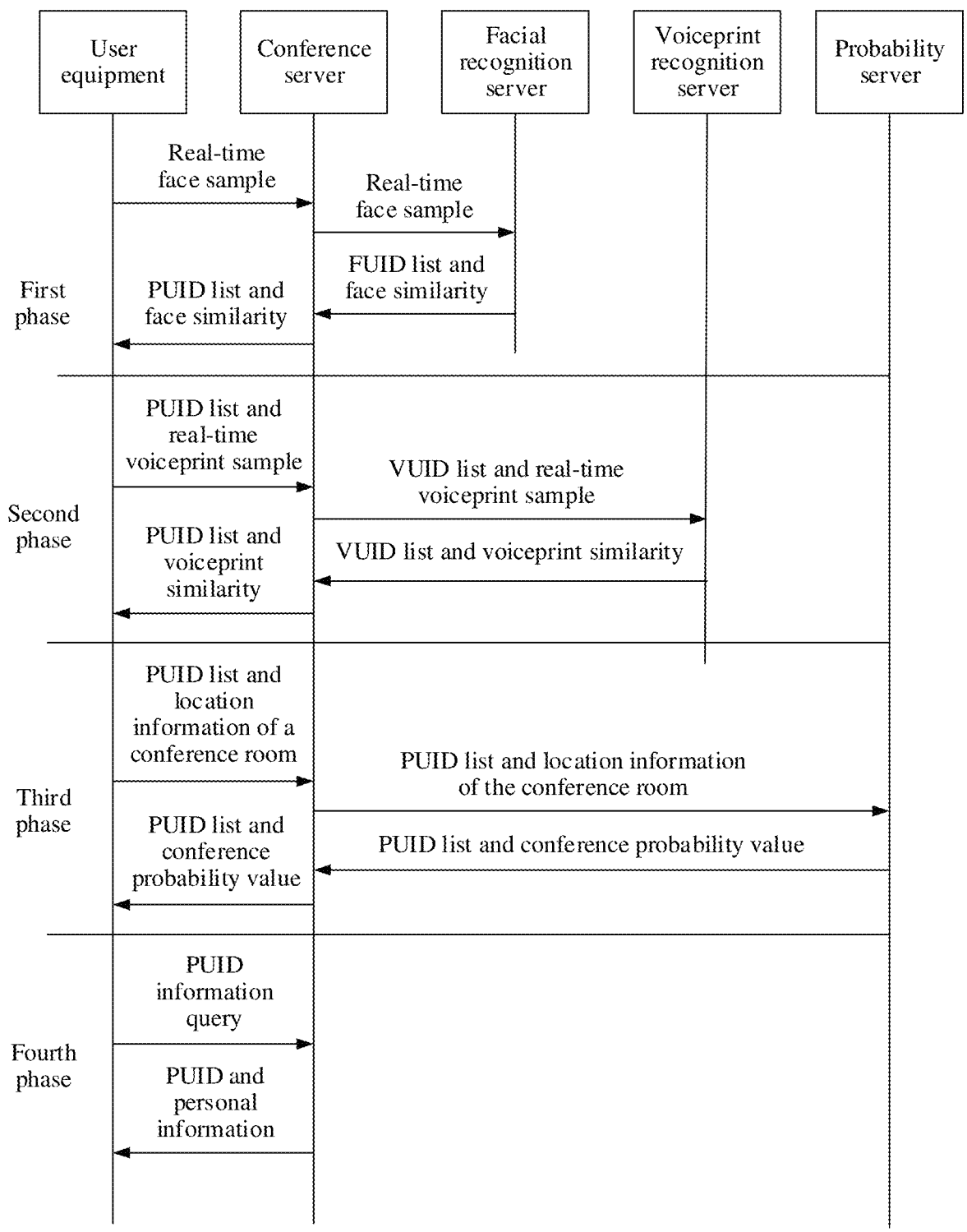
FIG. 11b is a diagram of an interaction process of an application scenario according to an embodiment.
Figure 11C:
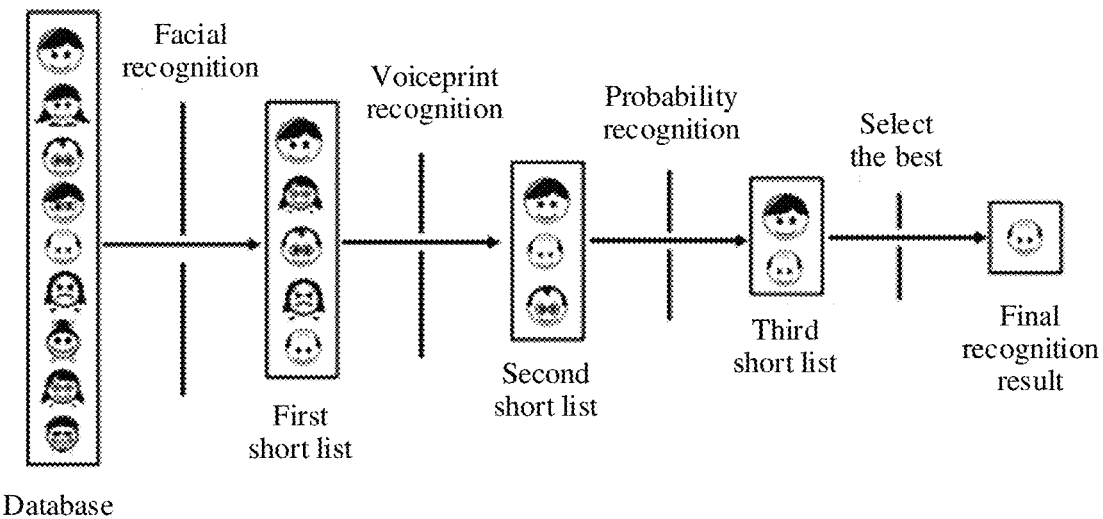
FIG. 11c is a schematic flowchart of an application scenario according to an embodiment.

As shown in FIG. 11b and FIG. 11c, FIG. 11b is a diagram of an interaction process of an application scenario according to an embodiment. The interaction process is divided into four phases: a first phase, a second phase, a third phase, and a fourth phase, where user equipment in the diagram of the interaction process includes a terminal and an AI camera. FIG. 11c is a schematic flowchart of an application scenario according to an embodiment.

In the first phase, the AI camera in the user equipment submits a real-time face sample to a conference server, and the conference server places the received real-time face sample at a tail of a facial recognition queue, and sends a real-time face sample at a head of the facial recognition queue to a facial recognition server to apply for facial recognition. The facial recognition server returns an FUID list and a face similarity to the conference server, and the conference server converts the FUID list into a PUID list and then forwards the PUID list together with the corresponding face similarity to the terminal in the user equipment, where the PUID list is a first short list.

In the second stage, the terminal in the user equipment submits a real-time voiceprint sample and the first short list to the conference server, and the conference server places the received real-time voiceprint sample and the first short list at a tail of a voiceprint recognition queue, and converts the PUID list of the first short list into a VUID list. The conference server sends a real-time voiceprint sample at a head of the voiceprint recognition queue and the VUID list to a voiceprint recognition server to apply for voiceprint recognition. The voiceprint recognition server returns the VUID list and a corresponding voiceprint similarity to the conference server, and the conference server converts the VUID list into a PUID list and then forwards the PUID list together with the corresponding voiceprint similarity to the terminal in the user equipment. The terminal removes, from the first short list, a PUID list in which the voiceprint similarity is less than a preset threshold, where the removed PUID list is a second short list.

In the third phase, the terminal submits location information of a conference room and the second short list to the conference server, and the conference server places the received location information of the conference room and the second short list at a tail of a probability query queue. The conference server sends location information that is of a conference room and that is at a head of the probability query queue and the second short list to a probability server to apply for probability query. The probability server returns the second short list and a conference probability value corresponding to the second short list to the conference server, and the conference server forwards the second short list and the conference probability value corresponding to the second short list to the terminal. The terminal performs cluster analysis on the second short list by using a probability priority method, and classifies a category including a maximum conference probability value into a third short list.

In the fourth phase, the terminal finds a PUID that is in the third short list and that has a highest similarity as a final result of identity recognition. The terminal sends this PUID to the conference server to apply for a personal information query, and the conference server returns personal information corresponding to the PUID, such as a name, an employee ID, a nickname, an age, a gender, a job title, and a name of a served unit.

Figure 12:
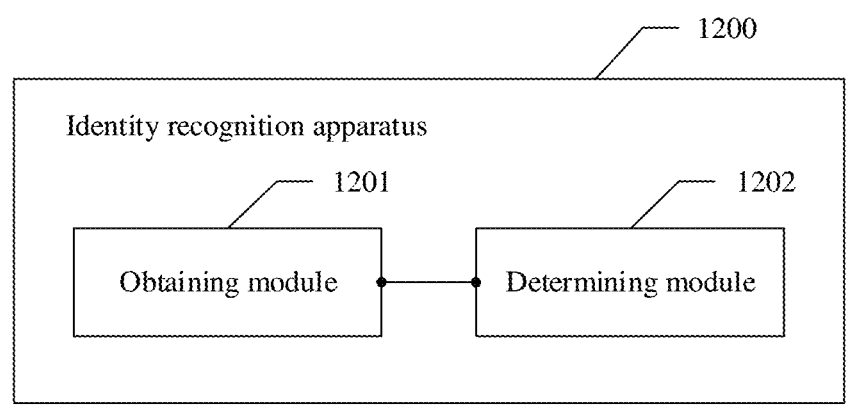
FIG. 12 is a schematic diagram of a structure of an identity recognition apparatus according to an embodiment.

The foregoing describes a method for recognizing an identity in a video conference. The following describes an identity recognition apparatus applied to the method for recognizing an identity in a video conference. Referring to FIG. 12, FIG. 12 provides one embodiment of an identity recognition apparatus 1200. The identity recognition apparatus 1200 includes an obtaining module 1201 and a determining module 1202.

The obtaining module 1201 is configured to obtain first biometric feature information in a video conference. The first biometric feature information includes at least one of facial feature information and voiceprint feature information.

The obtaining module 1201 is further configured to obtain second biometric feature information corresponding to an identity list in a database and a conference probability value corresponding to the identity list. The identity list includes at least one PUID. The second biometric feature information includes at least one of the facial feature information and the voiceprint feature information. The conference probability value is determined based on at least one of a participation probability value and a same conference probability value. In other words, the conference probability value is the participation probability value or the same conference probability value, or the conference probability value is a result determined in a preset manner based on the participation probability value and the same conference probability value. The preset manner includes one of an arithmetic average value, a weighted average value, and a maximum value.

The participation probability value is determined based on at least one of historical participation information and current participation information. In other words, the participation probability value is determined based on the historical participation information or the current participation information, or the participation probability value is a result determined in a preset manner based on a probability value that is respectively corresponding to the historical participation information and the current participation information. The preset manner includes but is not limited to one of an arithmetic average value, a weighted average value, and a maximum value. The current participation information includes at least one of location information of a conference room, conference notification information, personnel location information, and conference recording information, the conference recording information includes identity information corresponding to a PUID, and the identity information corresponding to the PUID includes at least one of a name, a nickname, a job title, and an employee ID. The historical participation information includes at least one of location information of a conference room, conference notification information, personnel location information, and conference recording information, the conference recording information includes identity information corresponding to a PUID, and the identity information corresponding to the PUID includes at least one of a name, a nickname, a job title, and an employee ID.

The same conference probability value is determined based on at least one of historical same conference information and current same conference information, and the current same conference information includes at least one of conference notification information, interpersonal relationship information, and personnel location information. The historical same conference information includes at least one of conference notification information, interpersonal relationship information, and personal location information.

The determining module 1202 is configured to determine, from the identity list and based on the second biometric feature information corresponding to the identity list and the conference probability value corresponding to the identity list, a PUID corresponding to the first biometric feature information.

In an implementation process, the determining module 1202 may determine, from the identity list and based on the second biometric feature information corresponding to the identity list and the conference probability value corresponding to the identity list, the PUID corresponding to the first biometric feature information in a plurality of manners. The following describes several possible implementations.

In a possible implementation, if the first biometric feature information includes the facial feature information, and the second biometric feature information includes the facial feature information, the determining module 1202 is configured to:

determine a first short list from the identity list based on the facial feature information in the second biometric feature information corresponding to the identity list, where a similarity between the facial feature information in the second biometric feature information corresponding to the first short list and the facial feature information in the first biometric feature information is not less than a preset threshold; determine a second short list from the first short list based on a conference probability value corresponding to the first short list, where the second short list includes a PUID corresponding to largest N conference probability values in the first short list, and N is an integer greater than 0; and determine, from the second short list and based on the facial feature information in second biometric feature information corresponding to the second short list, the PUID corresponding to the first biometric feature information, where facial feature information corresponding to the PUID corresponding to the first biometric feature information is most similar to the facial feature information in the first biometric feature information.

In a possible implementation, if the first biometric feature information includes the voiceprint feature information, and the second biometric feature information includes the voiceprint feature information, the determining module 1202 is configured to:

determine a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a preset threshold; determine a second short list from the first short list based on a conference probability value corresponding to the first short list, where the second short list includes a PUID corresponding to largest N conference probability values in the first short list, and N is an integer greater than 0; and determine, from the second short list and based on the voiceprint feature information in the second biometric feature information corresponding to the second short list, the PUID corresponding to the first biometric feature information, where voiceprint feature information corresponding to the PUID corresponding to the first biometric feature information is most similar to the voiceprint feature information in the first biometric feature information.

In a possible implementation, if the first biometric feature information includes the facial feature information and the voiceprint feature information, and the second biometric feature information includes the facial feature information and the biometric feature information, the determining module 1202 is configured to:

determine a first short list from the identity list based on the facial feature information in the second biometric feature information corresponding to the identity list, where a similarity between the facial feature information in the second biometric feature information corresponding to the first short list and the facial feature information in the first biometric feature information is not less than a first preset threshold; determine a second short list from the first short list based on the voiceprint feature information in the second biometric feature information corresponding to the first short list, where a similarity between the voiceprint feature information in the second biometric feature information corresponding to the second short list and the voiceprint feature information in the first biometric feature information is not less than a second preset threshold; determine a third short list from the second short list based on a conference probability value corresponding to the second short list, where the third short list includes a PUID corresponding to largest N conference probability values in the second short list, and N is an integer greater than 0; and determine, from the third short list and based on the facial feature information in the second biometric feature information corresponding to the third short list, the PUID corresponding to the first biometric feature information, where facial feature information corresponding to the PUID corresponding to the first biometric feature information is most similar to the facial feature information in the first biometric feature information.

In a possible implementation, if the first biometric feature information includes the facial feature information and the voiceprint feature information, and the second biometric feature information includes the facial feature information and the biometric feature information, the determining module 1202 is configured to:

determine a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a first preset threshold; determine a second short list from the first short list based on the facial feature information in the second biometric feature information corresponding to the first short list, where a similarity between the facial feature information in the second biometric feature information corresponding to the second short list and the facial feature information in the first biometric feature information is not less than a second preset threshold; determine a third short list from the second short list based on a conference probability value corresponding to the second short list, where the third short list includes a PUID corresponding to largest N conference probability values in the second short list, and N is an integer greater than 0; and determine, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information.

In a possible implementation, if the first biometric feature information includes the facial feature information and the voiceprint feature information, and the second biometric feature information includes the facial feature information and the biometric feature information, the determining module 1202 is configured to:

determine a first short list from the identity list based on the facial feature information in the second biometric feature information corresponding to the identity list, where a similarity between the facial feature information in the second biometric feature information corresponding to the first short list and the facial feature information in the first biometric feature information is not less than a preset threshold, and the preset threshold is set in advance by a terminal or a server based on an actual requirement; determine a second short list from the first short list based on a conference probability value corresponding to the first short list, where the second short list includes a PUID corresponding to largest N conference probability values in the first short list, and N is an integer greater than 0; and determine, from the second short list and based on the voiceprint feature information in the second biometric feature information corresponding to the second short list, the PUID corresponding to the first biometric feature information, where voiceprint feature information corresponding to the PUID corresponding to the first biometric feature information is most similar to the voiceprint feature information in the first biometric feature information.

In a possible implementation, if the first biometric feature information includes the voiceprint feature information and the facial feature information, and the second biometric feature information includes the voiceprint feature information and the facial feature information, the determining module 1202 is configured to:

determine a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a preset threshold, and the preset threshold is set in advance by a terminal or a server based on an actual requirement; determine a second short list from the first short list based on a conference probability value corresponding to the first short list, where the second short list includes a PUID corresponding to largest N conference probability values in the first short list, and N is an integer greater than 0; and determine, from the second short list and based on the facial feature information in the second biometric feature information corresponding to the second short list, the PUID corresponding to the first biometric feature information, where facial feature information corresponding to the PUID corresponding to the first biometric feature information is most similar to the facial feature information in the first biometric feature information.

In a possible implementation, if the first biometric feature information includes the facial feature information and the voiceprint feature information, and the second biometric feature information includes the facial feature information and the biometric feature information, the determining module 1202 is configured to:

determine a first short list from the identity list based on the facial feature information in the second biometric feature information corresponding to the identity list, where a similarity between the facial feature information in the second biometric feature information corresponding to the first short list and the facial feature information in the first biometric feature information is not less than a first preset threshold, and the first preset threshold is set in advance by a terminal or a server based on an actual requirement; determine a second short list from the first short list based on the voiceprint feature information in the second biometric feature information corresponding to the first short list, where a similarity between the voiceprint feature information in the second biometric feature information corresponding to the second short list and the voiceprint feature information in the first biometric feature information is not less than a second preset threshold, and the second preset threshold is set in advance by a terminal or a server based on an actual requirement; determine a third short list from the second short list based on a conference probability value corresponding to the second short list, where the third short list includes a PUID corresponding to largest N conference probability values in the second short list, and N is an integer greater than 0; and determine, from the third short list and based on the voiceprint feature information in the second biometric feature information corresponding to the third short list, the PUID corresponding to the first biometric feature information, where voiceprint feature information corresponding to the PUID corresponding to the first biometric feature information is most similar to the voiceprint feature information in the first biometric feature information.

In a possible implementation, if the first biometric feature information includes the facial feature information and the voiceprint feature information, and the second biometric feature information includes the facial feature information and the biometric feature information, the determining module 1202 is configured to:

determine a first short list from the identity list based on the voiceprint feature information in the second biometric feature information corresponding to the identity list, where a similarity between the voiceprint feature information in the second biometric feature information corresponding to the first short list and the voiceprint feature information in the first biometric feature information is not less than a first preset threshold, and the first preset threshold is set in advance by a terminal or a server based on an actual requirement; determine a second short list from the first short list based on the facial feature information in the second biometric feature information corresponding to the first short list, where a similarity between the facial feature information in the second biometric feature information corresponding to the second short list and the facial feature information in the first biometric feature information is not less than a second preset threshold, and the second preset threshold is set in advance by a terminal or a server based on an actual requirement; determine a third short list from the second short list based on a conference probability value corresponding to the second short list, where the third short list includes a PUID corresponding to largest N conference probability values in the second short list, and N is an integer greater than 0; and determine, from the third short list and based on the facial feature information in the second biometric feature information corresponding to the third short list, the PUID corresponding to the first biometric feature information, where facial feature information corresponding to the PUID corresponding to the first biometric feature information is most similar to the facial feature information in the first biometric feature information.

Figure 13:
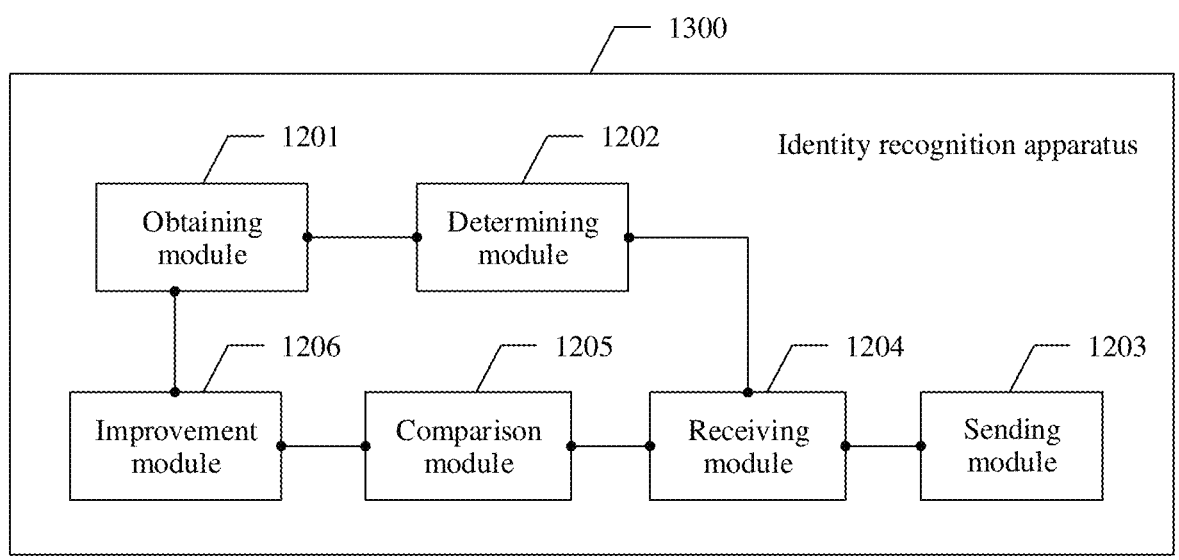
FIG. 13 is another schematic diagram of a structure of an identity recognition apparatus according to an embodiment.

Based on the embodiment corresponding to FIG. 12, referring to FIG. 13, FIG. 13 provides another embodiment of an identity recognition apparatus 1300. The identity recognition apparatus 1300 includes the obtaining module 1201, the determining module 1202, a sending module 1203, a receiving module 1204, a comparison module 1205, and an improvement module 1206.

In a possible implementation, the sending module 1203 is configured to: when the first short list further includes identity information corresponding to a PUID, send conference recording information during a current conference to a voice recognition server before the determining module 1202 determines the second short list from the first short list.

The receiving module 1204 is configured to receive a conversation text of the conference recording information from the voice recognition server.

The determining module 1202 is further configured to determine, based on the conversation text, identity information mentioned during the current conference.

The comparison module 1205 is configured to compare the mentioned identity information with identity information corresponding to the first short list.

The improvement module 1206 is configured to improve a conference probability value of a PUID that is in the first short list and that has the mentioned identity information.

In a possible implementation, the sending module 1203 is configured to: when the second short list further includes identity information corresponding to a PUID, send conference recording information during a current conference to a voice recognition server before the determining module 1202 determines the third short list from the second short list.

The receiving module 1204 is configured to receive a conversation text of the conference recording information from the voice recognition server.

The determining module 1202 is further configured to determine, based on the conversation text, identity information mentioned during the current conference.

The comparison module 1205 is configured to compare the mentioned identity information with identity information corresponding to the second short list.

The improvement module 1206 is configured to improve a conference probability value of a PUID that is in the second short list and that has the mentioned identity information.

In a possible implementation, the sending module 1203 is configured to: when the first short list further includes identity information corresponding to a PUID, send conference recording information during a current conference to a voice recognition server before the determining module 1202 determines the second short list from the first short list.

The receiving module 1204 is configured to receive identity information that is determined based on the conference recording information and that is from the voice recognition server.

The comparison module 1205 is configured to compare the determined identity information with identity information corresponding to the first short list.

The improvement module 1206 is configured to improve a conference probability value of a PUID that is in the first short list and that has the determined identity information.

In a possible implementation, the sending module 1203 is configured to: when the second short list further includes identity information corresponding to a PUID, send conference recording information during a current conference to a voice recognition server before the determining module 1202 determines the third short list from the second short list.

The receiving module 1204 is configured to receive identity information that is determined based on the conference recording information and that is from the voice recognition server.

The comparison module 1205 is configured to compare the determined identity information with identity information corresponding to the second short list.

The improvement module 1206 is configured to improve a conference probability value of a PUID that is in the second short list and that has the determined identity information.

Further, the identity recognition apparatuses in FIG. 12 and FIG. 13 are presented in a form of a functional module. The "module" herein may be an application-specific integrated circuit (ASIC), a circuit, a processor and a memory for executing one or more software or firmware programs, an integrated logic circuit, and/or another device that can provide the foregoing function. In a simple embodiment, the identity recognition apparatuses in FIG. 12 and FIG. 13 may use a form shown in FIG. 14.

Figure 14:
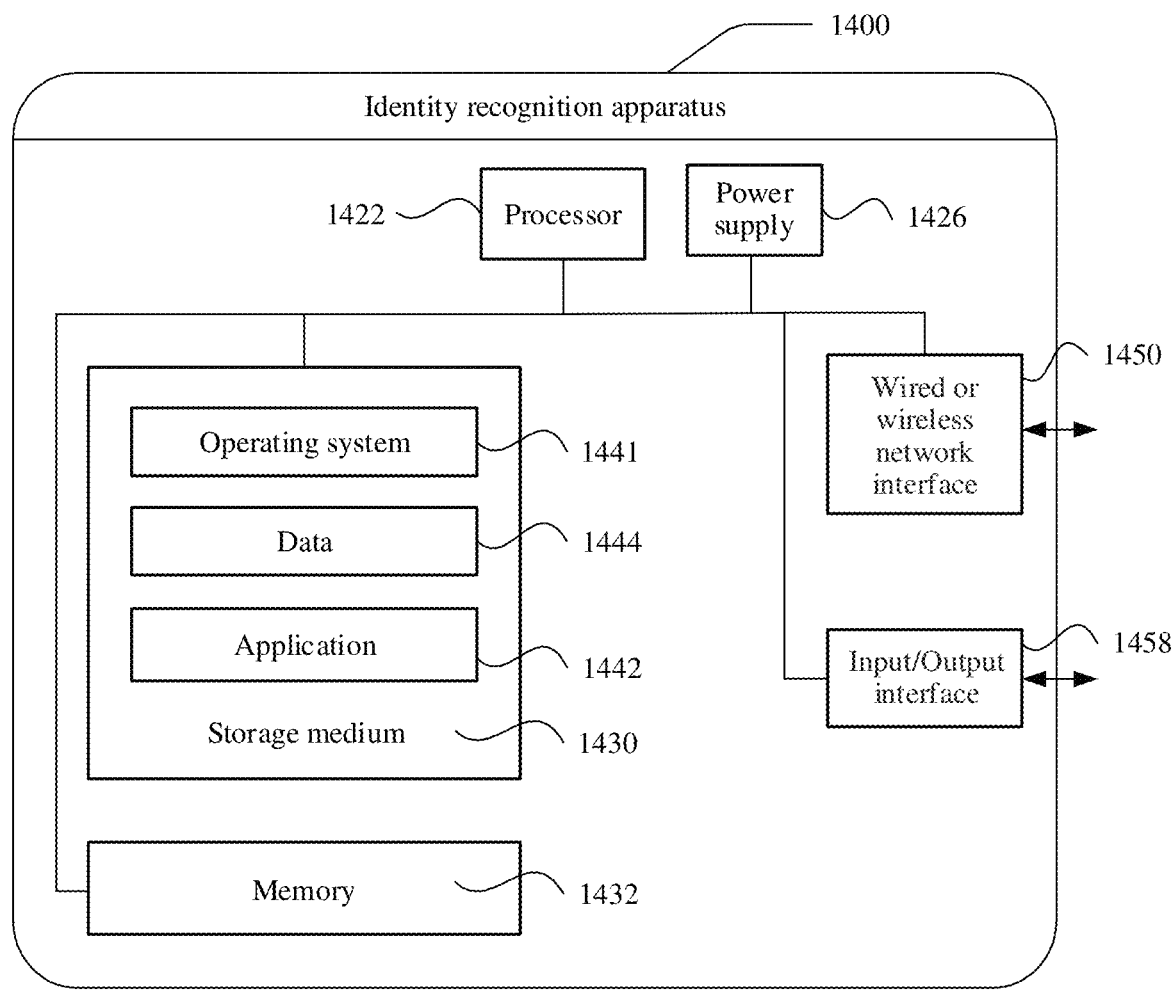
FIG. 14 is another schematic diagram of a structure of an identity recognition apparatus according to an embodiment.

FIG. 14 is a schematic diagram of a structure of an identity recognition apparatus 1400 according to an embodiment. The identity recognition apparatus 1400 may have a relatively large difference because of different configuration or different performance, and may include one or more processors 1422 and a memory 1432, and one or more storage media 1430 (for example, one or more mass storage devices) storing an application program 1442 or data 1444. The memory 1432 and the storage medium 1430 may be used for temporary storage or permanent storage. A program stored in the storage medium 1430 may include one or more modules (not shown in the figure), and each module may include a series of instruction operations for the identity recognition apparatus. Further, the processor 1422 may be configured to communicate with the storage medium 1430 and perform, on the identity recognition apparatus 1400, the series of instruction operations in the storage medium 1430.

The identity recognition apparatus 1400 may further include one or more power supplies 1426, one or more wired or wireless network interfaces 1450, one or more input/output interfaces 1458, and/or one or more operating systems 1441.

The processor 1422 enables the identity recognition apparatus to perform the steps actually performed by the identity recognition apparatus in the method embodiments corresponding to FIG. 2 to FIG. 10.

An embodiment provides a computer storage medium, configured to store computer software instructions used by the foregoing identity recognition apparatus. The computer software instructions include a program designed for the method actually performed by the identity recognition apparatus in the method embodiments corresponding to FIG. 2 to FIG. 10.

It may be clearly understood by persons skilled in the art that, for ease and brief description, for a detailed working process of the foregoing system, apparatus and units, refer to a corresponding process in the foregoing method embodiments, and details are not described herein again.

In the several embodiments provided, the system, apparatus and method may be implemented in other manners. For example, the described apparatus embodiments are merely examples. For example, division into the units is merely logical function division and may be other division in an actual implementation. For example, a plurality of units or components may be combined or integrated into another system.

The units described as separate parts may or may not be physically separate, and parts displayed as units may or may not be physical units, may be located in one position, or may be distributed on a plurality of network devices.

All or some of the technical solutions may be implemented in a form of a computer software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a universal serial bus flash disk (USB flash disk), a removable hard disk, a read-only memory (ROM), a random access memory (RAM), a magnetic disk, or an optical disc.

The foregoing embodiments are merely intended for describing the technical solutions, but not for limiting the embodiments. Although the embodiments are described in detail with reference to the foregoing embodiments, persons skilled in the art should understand that they may still make modifications to the technical solutions described in the foregoing embodiments or replace some technical features with features having a same function, without departing from the scope of the claims.

What is claimed is:

1. A method for recognizing an identity in a video conference, comprising:
    obtaining, by an identity recognition apparatus, first biometric feature information in a video conference, wherein the first biometric feature information includes at least one of first facial feature information and first voiceprint feature information;
    obtaining, by the identity recognition apparatus, second biometric feature information corresponding to an identity list in a database and a conference probability value corresponding to the identity list, wherein the identity list includes at least one personal unique identifier, the second biometric feature information is determined prior to the video conference and includes at least one of second facial feature information and second voiceprint feature information, and the conference probability value is determined based on at least one of a participation probability value and a same conference probability value;
    determining, by the identity recognition apparatus, from the identity list and based on the second biometric feature information corresponding to the identity list and the conference probability value corresponding to the identity list, a personal unique identifier corresponding to the first biometric feature information;
    wherein the method further comprises:
        determining, by the identity recognition apparatus, a first short list from the identity list based on the second biometric feature information corresponding to the identity list;
        determining, by the identity recognition apparatus, a second short list from the first short list based on a conference probability value corresponding to the first short list; and
        determining, by the identity recognition apparatus, from the second short list and based on the second biometric feature information corresponding to the second short list, the personal unique identifier corresponding to the first biometric feature information; or
        determining, by the identity recognition apparatus, a third short list from the identity list based on the second biometric feature information corresponding to the identity list;
        determining, by the identity recognition apparatus, a fourth short list from the first short list based on the second biometric feature information corresponding to the third short list;
        determining, by the identity recognition apparatus, a fifth short list from the fourth short list based on a conference probability value corresponding to the fourth short list;
        determining, by the identity recognition apparatus, from the fifth short list and based on the second biometric feature information corresponding to the fifth short list, the personal unique identifier corresponding to the first biometric feature information.

2. The method according to claim 1, wherein the first biometric feature information includes the first facial feature information, and the second biometric feature information includes the second facial feature information;
    wherein a similarity between the second facial feature information in the second biometric feature information corresponding to the first short list and the first facial feature information in the first biometric feature information is not less than a preset threshold;
    wherein the second short list includes a personal unique identifier corresponding to a largest N conference probability values in the first short list, wherein N is an integer greater than 0; and
    wherein facial feature information corresponding to the personal unique identifier corresponding to the first biometric feature information is most similar to the first facial feature information in the first biometric feature information.

3. The method according to claim 1, wherein the first biometric feature information includes the first voiceprint feature information, and the second biometric feature information includes the second voiceprint feature information;
    wherein a similarity between the second voiceprint feature information in the second biometric feature information corresponding to the first short list and the first voiceprint feature information in the first biometric feature information is not less than a preset threshold;
    wherein the second short list includes a personal unique identifier corresponding to a largest N conference probability values in the first short list, wherein N is an integer greater than 0; and
    wherein voiceprint feature information corresponding to the personal unique identifier corresponding to the first biometric feature information is most similar to the first voiceprint feature information in the first biometric feature information.

4. The method according to claim 1, wherein the first biometric feature information includes the first facial feature information and the first voiceprint feature information, and the second biometric feature information includes the second facial feature information and the second biometric feature information;
- wherein a similarity between the second facial feature information in the second biometric feature information corresponding to the third short list and the first facial feature information in the first biometric feature information is not less than a first preset threshold;
- wherein a similarity between the second voiceprint feature information in the second biometric feature information corresponding to the fourth short list and the first voiceprint feature information in the first biometric feature information is not less than a second preset threshold;
- wherein the third short list includes a personal unique identifier corresponding to a largest N conference probability values in the second short list, wherein N is an integer greater than 0; and
- wherein facial feature information corresponding to the personal unique identifier corresponding to the first biometric feature information is most similar to the first facial feature information in the first biometric feature information.

5. The method according to claim 1, wherein the first biometric feature information includes the first facial feature information and the first voiceprint feature information, and the second biometric feature information includes the second facial feature information and the second biometric feature information;
- wherein a similarity between the second voiceprint feature information in the second biometric feature information corresponding to the third short list and the first voiceprint feature information in the first biometric feature information is not less than a first preset threshold;
- wherein a similarity between the second facial feature information in the second biometric feature information corresponding to the fourth short list and the first facial feature information in the first biometric feature information is not less than a second preset threshold;
- wherein the fifth short list includes a personal unique identifier corresponding to a largest N conference probability values in the second short list, wherein N is an integer greater than 0; and
- wherein voiceprint feature information corresponding to the personal unique identifier corresponding to the first biometric feature information is most similar to the first voiceprint feature information in the first biometric feature information.

6. The method according to claim 2, wherein the first short list further includes identity information corresponding to the personal unique identifier, and before determining the second short list from the first short list, the method further comprises:
- sending, by the identity recognition apparatus, conference recording information during a current conference to a voice recognition server;
- receiving, by the identity recognition apparatus, a conversation text of the conference recording information from the voice recognition server;
- determining, by the identity recognition apparatus based on the conversation text, identity information mentioned during the current conference;
- comparing, by the identity recognition apparatus, the mentioned identity information with identity information corresponding to the first short list; and
- improving, by the identity recognition apparatus, a conference probability value of a personal unique identifier that is in the first short list and that has the mentioned identity information.

7. The method according to claim 4, wherein the fourth short list further includes identity information corresponding to the personal unique identifier, and before determining the fifth short list from the second short list, the method further comprises:
- sending, by the identity recognition apparatus, conference recording information during a current conference to a voice recognition server;
- receiving, by the identity recognition apparatus, a conversation text of the conference recording information from the voice recognition server;
- determining, by the identity recognition apparatus based on the conversation text, identity information mentioned during the current conference;
- comparing, by the identity recognition apparatus, the mentioned identity information with identity information corresponding to the second short list; and
- improving, by the identity recognition apparatus, a conference probability value of a personal unique identifier that is in the second short list and that has the mentioned identity information.

8. The method according to claim 2, wherein the first short list further includes identity information corresponding to the personal unique identifier, and before determining the second short list from the first short list, the method further comprises:
- sending, by the identity recognition apparatus, conference recording information during a current conference to a voice recognition server;
- receiving, by the identity recognition apparatus, identity information that is determined based on the conference recording information and that is from the voice recognition server;
- comparing, by the identity recognition apparatus, the determined identity information with identity information corresponding to the first short list; and
- improving, by the identity recognition apparatus, a conference probability value of a personal unique identifier that is in the first short list and that has the determined identity information.

9. The method according to claim 4, wherein the fourth short list further includes identity information corresponding to the personal unique identifier, and before determining the fifth short list from the second short list, the method further comprises:
- sending, by the identity recognition apparatus, conference recording information during a current conference to a voice recognition server;
- receiving, by the identity recognition apparatus, identity information that is determined based on the conference recording information and that is from the voice recognition server;
- comparing, by the identity recognition apparatus, the determined identity information with identity information corresponding to the second short list; and
- improving, by the identity recognition apparatus, a conference probability value of a personal unique identifier that is in the second short list and that has the determined identity information.

10. An identity recognition apparatus, comprising:
- a memory, configured to store computer-executable program code;
- a network interface; and a processor, coupled to the memory and the network interface, wherein the program code comprises at least one instruction, and when the processor executes the at least one instruction, the identity recognition apparatus is configured to:

obtain first biometric feature information in a video conference, wherein the first biometric feature information includes at least one of first facial feature information and first voiceprint feature information;

obtain second biometric feature information corresponding to an identity list in a database and a conference probability value corresponding to the identity list, wherein the identity list includes at least one personal unique identifier, the second biometric feature information is determined prior to the video conference and includes at least one of second facial feature information and second voiceprint feature information, and the conference probability value is determined based on at least one of a participation probability value and a same conference probability value;

determine from the identity list and based on the second biometric feature information corresponding to the identity list and the conference probability value corresponding to the identity list, a personal unique identifier corresponding to the first biometric feature information;

wherein the identity recognition apparatus is further configured to:

determine a first short list from the identity list based on the second facial feature information in the second biometric feature information corresponding to the identity list;

determine a second short list from the first short list based on a conference probability value corresponding to the first short list;

determine from the second short list and based on the second biometric feature information corresponding to the second short list, the personal unique identifier corresponding to the first biometric feature information;

or;

determine a third short list from the identity list based on the second facial feature information in the second biometric feature information corresponding to the identity list;

determine a fourth short list from the first short list based on the second voiceprint feature information in the second biometric feature information corresponding to the first short list;

determine a fifth short list from the second short list based on a conference probability value corresponding to the second short list;

determine from the fifth short list and based on the second facial feature information in the second biometric feature information corresponding to the third short list, the personal unique identifier corresponding to the first biometric feature information.

11. The identity recognition apparatus according to claim 10, wherein the first biometric feature information includes the first facial feature information, and the second biometric feature information includes the second facial feature information;

wherein a similarity between the second facial feature information in the second biometric feature information corresponding to the first short list and the first facial feature information in the first biometric feature information is not less than a preset threshold;

wherein the second short list includes a personal unique identifier corresponding to a largest N conference probability values in the first short list, wherein N is an integer greater than 0; and wherein facial feature information corresponding to the personal unique identifier corresponding to the first biometric feature information is most similar to the first facial feature information in the first biometric feature information.

12. The identity recognition apparatus according to claim 10, wherein if the first biometric feature information includes the first voiceprint feature information, and the second biometric feature information includes the second voiceprint feature information;

wherein a similarity between the second voiceprint feature information in the second biometric feature information corresponding to the first short list and the first voiceprint feature information in the first biometric feature information is not less than a preset threshold;

wherein the second short list includes a personal unique identifier corresponding to a largest N conference probability values in the first short list, wherein N is an integer greater than 0; and wherein voiceprint feature information corresponding to the personal unique identifier corresponding to the first biometric feature information is most similar to the first voiceprint feature information in the first biometric feature information.

13. The identity recognition apparatus according to claim 10, wherein the first biometric feature information includes the first facial feature information and the first voiceprint feature information, and the second biometric feature information includes the second facial feature information and the second biometric feature information;

wherein a similarity between the second facial feature information in the second biometric feature information corresponding to the third short list and the first facial feature information in the first biometric feature information is not less than a first preset threshold;

wherein a similarity between the second voiceprint feature information in the second biometric feature information corresponding to the fourth short list and the first voiceprint feature information in the first biometric feature information is not less than a second preset threshold;

wherein the fifth short list includes a personal unique identifier corresponding to a largest N conference probability values in the second short list, wherein N is an integer greater than 0; and wherein facial feature information corresponding to the personal unique identifier corresponding to the first biometric feature information is most similar to the first facial feature information in the first biometric feature information.

14. The identity recognition apparatus according to claim 10, wherein the first biometric feature information includes the first facial feature information and the first voiceprint feature information, and the second biometric feature information includes the second facial feature information and the second biometric feature information;

wherein a similarity between the second voiceprint feature information in the second biometric feature information corresponding to the third short list and the first voiceprint feature information in the first biometric feature information is not less than a first preset threshold;

wherein a similarity between the second facial feature information in the second biometric feature information corresponding to the fourth short list and the first facial feature information in the first biometric feature information is not less than a second preset threshold;

wherein the fifth short list includes a personal unique identifier corresponding to a largest N conference probability values in the second short list, wherein N is an integer greater than 0; and wherein voiceprint feature information corresponding to the personal unique identifier corresponding to the first biometric feature information is most similar to the first voiceprint feature information in the first biometric feature information.

15. The identity recognition apparatus according to claim 11, wherein the first short list further includes identity information corresponding to the personal unique identifier, and before determining the second short list from the first short list the identity recognition apparatus is further configured to:

send conference recording information during a current conference to a voice recognition server;

receive a conversation text of the conference recording information from the voice recognition server;

determine based on the conversation text, identity information mentioned during the current conference;

compare the mentioned identity information with identity information corresponding to the first short list; and improve a conference probability value of a personal unique identifier that is in the first short list and that has the mentioned identity information.

16. The identity recognition apparatus according to claim 13, wherein the fourth short list further includes identity information corresponding to the personal unique identifier, and before determining the fifth short list from the second short list the identity recognition apparatus is further configured to:

send conference recording information during a current conference to a voice recognition server;

receive a conversation text of the conference recording information from the voice recognition server;

determine based on the conversation text, identity information mentioned during the current conference;

compare the mentioned identity information with identity information corresponding to the second short list; and improve a conference probability value of a personal unique identifier that is in the second short list and that has the mentioned identity information.

17. The identity recognition apparatus according to claim 11, wherein the first short list further includes identity information corresponding to the personal unique identifier, and before determining the second short list from the first short list, the identity recognition apparatus is further configured to:

send conference recording information during a current conference to a voice recognition server;

receive identity information that is determined based on the conference recording information and that is from the voice recognition server;

compare the determined identity information with identity information corresponding to the first short list; and improve a conference probability value of a personal unique identifier that is in the first short list and that has the determined identity information.

18. The identity recognition apparatus according to claim 13, wherein the fourth short list further includes identity information corresponding to the personal unique identifier, and before determining the fifth short list from the fourth short list, the identity recognition apparatus is further configured to:

send conference recording information during a current conference to a voice recognition server;

receive identity information that is determined based on the conference recording information and that is from the voice recognition server;

compare the determined identity information with identity information corresponding to the second short list; and improve a conference probability value of a personal unique identifier that is in the second short list and that has the determined identity information.

19. A non-transitory computer-readable storage medium, comprising an instruction, wherein when the instruction runs on a computer, the computer is enabled to perform the method according to claim 1.

* * * * *